US005556282A

United States Patent [19]
Middlebrook

[11] Patent Number: 5,556,282
[45] Date of Patent: Sep. 17, 1996

[54] METHOD FOR THE GEOGRAPHICAL PROCESSSING OF GRAPHIC LANGUAGE TEXTS

[76] Inventor: R. David Middlebrook, 47 Hemlock Cir., Princeton, N.J. 08540

[21] Appl. No.: 184,493

[22] Filed: Jan. 18, 1994

[51] Int. Cl.$^6$ .................................................. G09B 21/00
[52] U.S. Cl. .......................... 434/178; 434/156; 434/159; 434/167
[58] Field of Search .................................. 434/156, 167, 434/169, 170, 171, 172, 176, 178–180, 112, 159; 364/419.01, 419.08, 419.03

[56] References Cited

U.S. PATENT DOCUMENTS

| | | | |
|---|---|---|---|
| 4,661,074 | 4/1987 | Walker | 434/178 |
| 4,807,905 | 2/1989 | Reagan | 434/167 X |
| 4,878,843 | 11/1989 | Kuch | 434/112 |
| 4,907,971 | 3/1990 | Tucker | 434/167 |
| 5,057,020 | 10/1991 | Cytanovich | 434/178 |
| 5,108,113 | 4/1992 | Leach | 434/167 X |
| 5,306,153 | 4/1994 | Foster | 434/170 |
| 5,336,093 | 8/1994 | Cox | 434/178 |

*Primary Examiner*—Richard J. Apley
*Assistant Examiner*—Glenn E. Richman
*Attorney, Agent, or Firm*—LaMorte & Associates

[57] ABSTRACT

A method employing the art, science, and technology of cartography to decode and comprehend graphic language texts. Improved reading and writing proficiency and efficiency may be realized by mapping a graphic language textscape (c.f. landscape). A textscape may be mapped with regard to typography, graphic or phonetic attributes of selected graphic features, meaning or usage of selected graphic features, statistical analyses of the attributes, meaning, or usage of selected graphic features, or semantic, rhetorical, compositional, thematic, or conceptual configuration. Two or more textmaps may be compared by sequential display, juxtaposition, superimposition, or animation (rapid sequential display). Elements of two or more textmaps may be combined either selectively or wholesale to produce a new textmap. Textmapping may be practiced in any scale, in up to four dimensions. Textmapping may be practiced directly upon a text, as well as indirectly, off to the side or on a separate surface, for example. Textmapping may be practiced as a manual process, such as by using a pencil to map a text in a hardcopy format (i.e. computer printout, book, magazine, etc.), or it may be practiced as an automated process, such as by using a computer to map a text which has been stored in digital form.

9 Claims, 16 Drawing Sheets

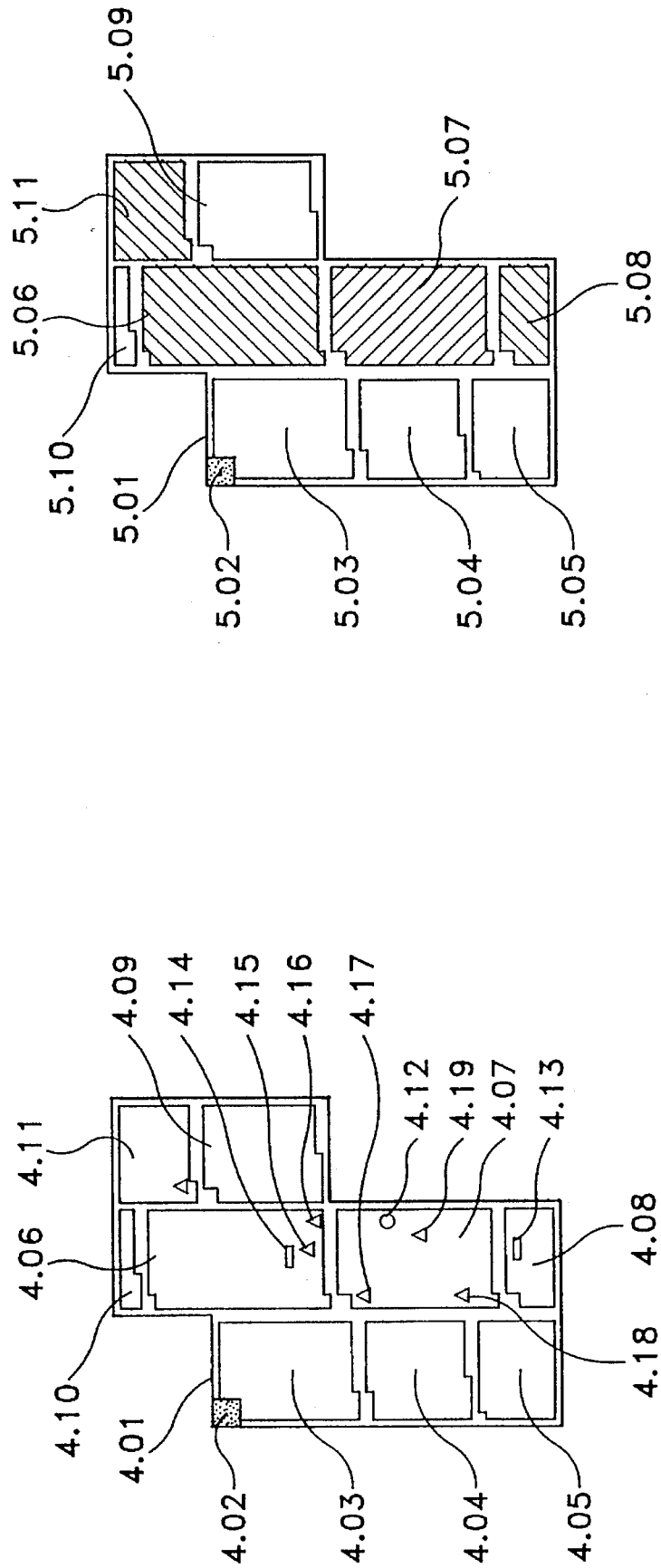

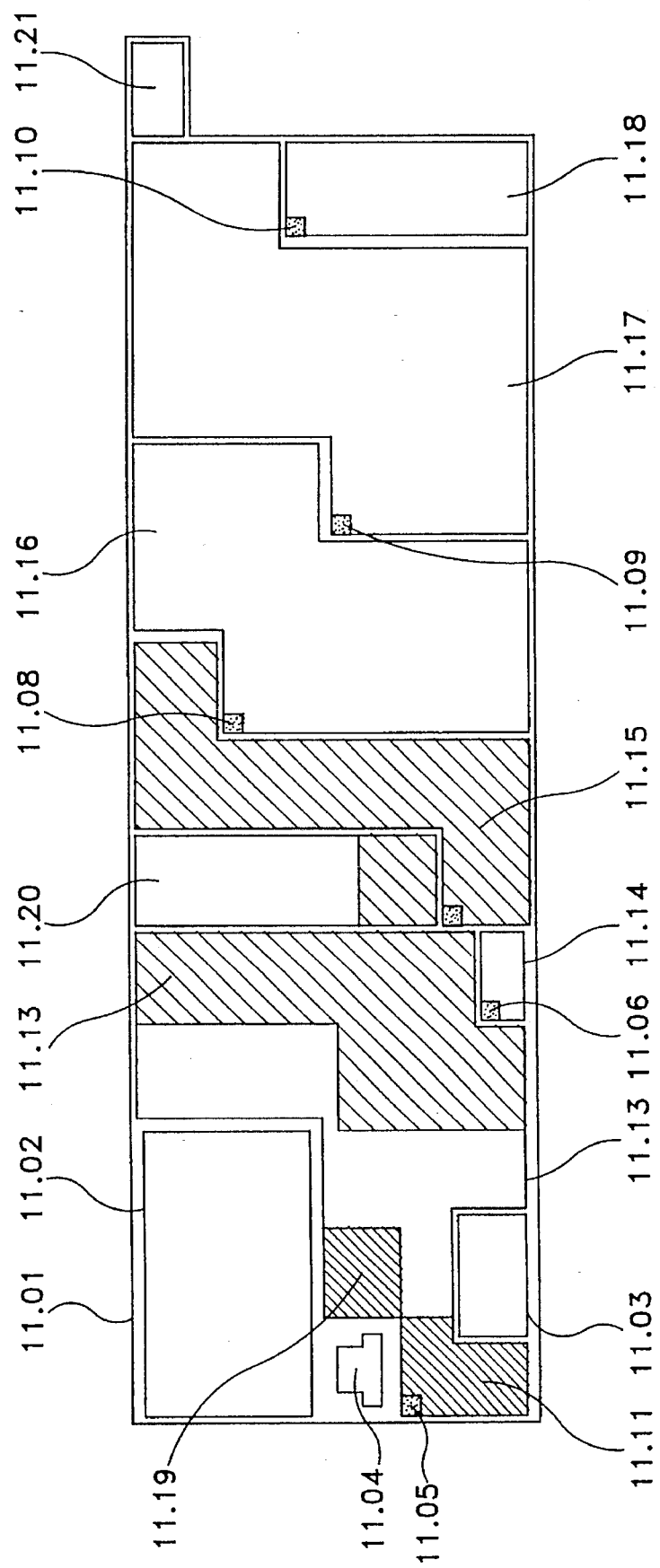

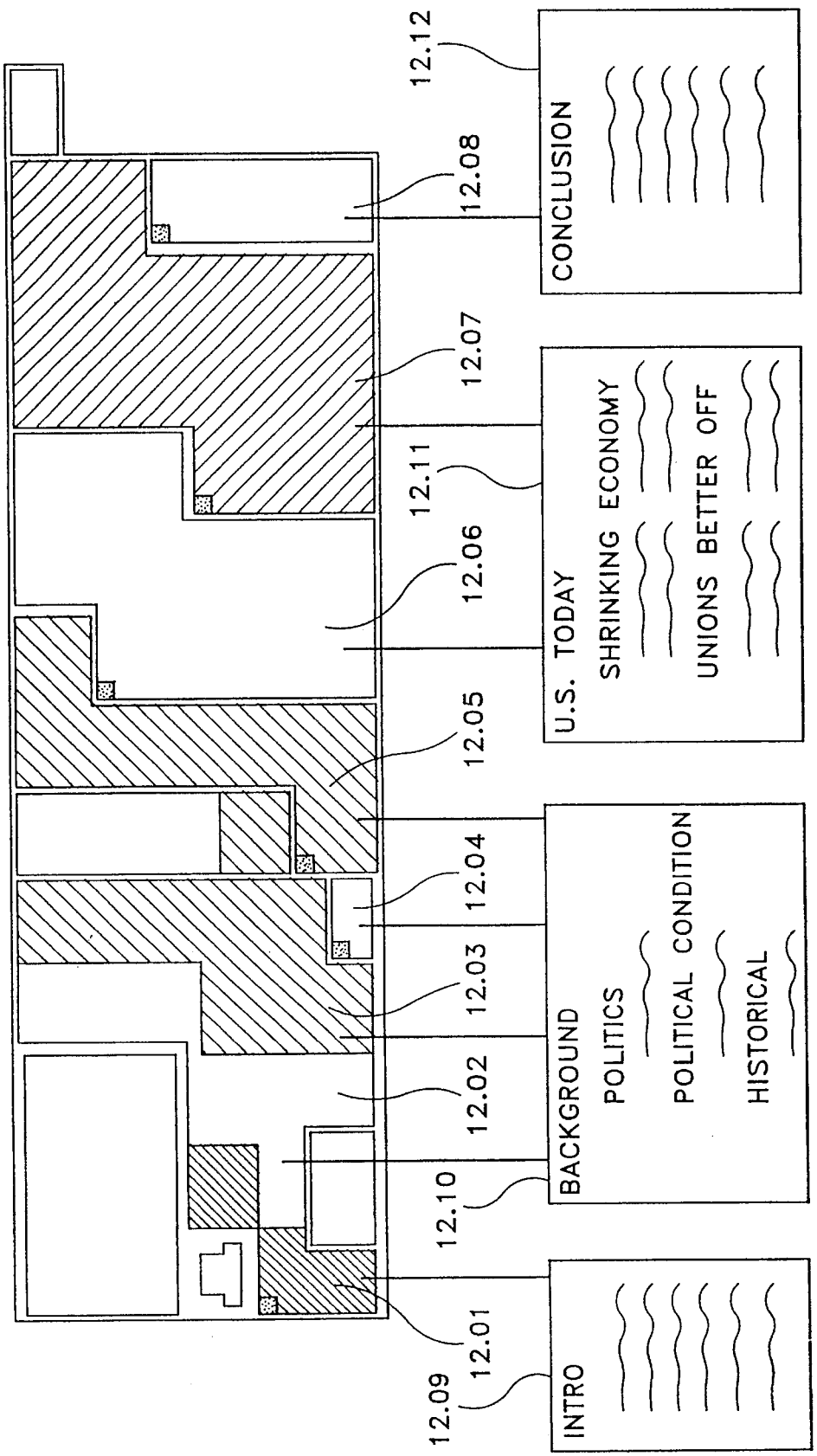

METHOD FOR THE GEOGRAPHICAL PROCESSSING OF GRAPHIC LANGUAGE TEXTS

FIELD OF THE INVENTION

The present invention is related to the fields of Linguistics and Cartography. It relates generally to strategies and methods for decoding and comprehending graphic language texts, as well as to the practice and instruction of such strategies. More specifically, the present invention relates to the practice and instruction of compensatory strategies and the corresponding methods for teaching reading and writing to the learning disabled.

BACKGROUND OF THE INVENTION

Reading and writing, as currently defined in our culture, require extensive use of a limited number of genetically inherited abilities. The most important of these abilities are foveal vision, auditory processing and sequential processing. A common finding is that individuals who are diagnosed as having foveal vision deficiencies and/or auditory or sequential processing deficits are regularly classified as learning disabled, i.e. not able or less able to learn, despite the fact that these same "disabled" individuals often have very strong abilities, i.e. learning abilities, in such areas as visual and/or spatial processing and parafoveal and/or peripheral vision.

Such findings say at least as much about our culture's linguistic ability bias as they do about the ability limitations of individuals. Unfortunately, educators and researchers have largely failed to address ability. They have, instead, continued to focus their attention upon diagnosis and remediation, i.e. identifying and "fixing" the deficits and deficiencies of the individual. Thus, the diagnostic/remedial approach begins with the question, "How do we fix the individual so that they are better able to process text foveally, auditorally, and sequentially?".

In contrast, the present invention focuses upon ability. It is founded on the question, "How do we redesign the existing grapho-linguistic tools and processes, i.e. text and the methods of processing text, so that individuals who have abilities in the areas of visual processing, spatial processing, and/or parafoveal and peripheral vision are enabled to use these abilities for reading and writing?".

The solution offered by the present invention is based upon the use of cartographic methods and techniques to map graphic language texts. Textmapping provides a means of decoding and comprehending text as graphic information. Essentially, it is the visuospatial equivalent of currently accepted auditory reading techniques, which provide a means of decoding and comprehending text as auditory information. Both textmapping and the currently accepted approaches to reading provide means of structuring information so that it may be understood, remembered, and recalled. They differ, however, in the way they perceive the messages contained in text and in the nature of the structures and metaphors used to aid comprehension.

Currently accepted reading techniques regard text as sound. Graphic language is perceived foveally, decoded as sound information, structured as sequences or hierarchies, and comprehended as abstract concepts. By comparison, the present invention utilizes textmapping which regards text as an image. Textmapping is a descriptive process whereby text information is perceived foveally or parafoveally/peripherally, and is decoded as visual information, structured as simultaneous images and spatial relationships, and comprehended as a concrete image.

Textmapping thus provides an alternative to the existing foveal/auditory/sequential reading model. It represents a shift in focus: instead of remediating the individual's disabilities, it seeks to make the best use of the individual's abilities, namely parafoveal/peripheral vision and visual/spatial processing.

DESCRIPTION OF PRIOR ART

The closest relatives to the present invention method of textmapping are text-highlighting and Graphical User Interface (GUI) displays. Textmapping, text-highlighting, and GUI displays all belong to the graphic arts, and thus they all share a number of superficial visual similarities. However, the present invention of textmapping is clearly distinguished from text-highlighting and GUI displays by virtue of the fact that it belongs to a distinct discipline within the graphic arts: cartography.

With regard to text-highlighting, there are a great many examples in the current art, ranging from the common use of highlighter pens and markers by students and professionals, to inventions such as U.S. Pat. No. 4,270,284, which calls for emphasizing similarities and differences among and between selected text portions by means of highlighting. The present invention of textmapping is distinguished from text-highlighting in three fundamental ways. First, the present invention of textmapping is a descriptive art, while text-highlighting is merely an educative/extractive procedure. Second, the present invention method of textmapping regards graphic context as the message, while text-highlighting regards graphic context as the background noise from which the message must be educed. Third, the present invention method of textmapping treats all text portions equally as organic constituents or components of a concrete whole, while text-highlighting treats some text portions as irrelevant and others as instances, extracts, abstracts or distillates of an abstract whole.

With regard to GUI displays, the similarities between the present invention method of textmapping and GUI displays can be seen in 1) their common use of graphic devices, such as color, shapes, and lines to partition a display screen, and in 2) their use of logographic symbols such as icons. However, in their treatment of display topography, especially with regard to dimensional and spatial integrity, textmaps and GUI displays are worlds apart.

GUI displays are based upon a variety of 3-dimensional metaphors such as windows opening and closing, pull-down blinds, and papers piled one on top of the other on a desktop. In a GUI display, windows can be opened (i.e. created) at any location, as well as closed (i.e. erased) without impacting information which existed at that location previously. Similarly, menu screens may be pulled-down (i.e. opened) into areas occupied by other information without impacting the existing information. Windows may be stacked upon windows, as if they were a pile of papers on a desk. The windows in a stack need not contain related information, nor does the information in any two windows have to be in the same scale.

The clear distinction between textmaps and GUI displays is revealed in the way that GUI displays pack these 3-dimensional metaphors into the 2-dimensional display. GUI displays appear to accomplish this task by showing a 2-dimensional slice or visual plane of the metaphorical 3-dimensional field, however, in actuality they show pieces from many different 2-dimensional slices or visual planes. Moreover, pieces may at any time be imported into, or exported from, the 2-dimensional plane of the display screen. The result from a spatial perspective is a constantly changing and shifting visual cacophony characterized by fluid shapes, impermanent boundaries, incongruities in scale, and total confusion with regard to the dimensional and spatial relationships which might or might not exist between and among the various pieces of information displayed on the screen. There is nothing inherently wrong with this way of presenting information, but it is far removed from the spatial integrity of the present invention method of textmapping.

Finally, another method which is well-known in the prior art, semantic mapping, also deserves brief notice, if only because the term "mapping" is part of its name. Semantic mapping is a strategy commonly used in the field of education as an aid for organizing information and ideas. In comparison to the present invention method of textmapping, which provides a means of mapping a text, semantic mapping provides a means of diagramming recalled information which has been gleaned from a text. Consequently, while the present invention method of textmapping creates a spatially accurate representation of the text itself, a semantic "map" creates a conceptual diagram representing an individual's understanding of the text.

OBJECTS OF THE INVENTION

It is an object of the present invention to provide a method to enable learning disabled individuals to use their visual/spatial ability and/or parafoveal/peripheral vision instead of, or in addition to, their auditory ability and/or foveal vision for processing graphic language texts.

Another object of this invention is to provide a method to enable non-disabled individuals to use their visual/spatial ability and peripheral vision for processing graphic language texts.

Yet another object of this invention is to provide a method for the use of maps as metaphors for decoding, comprehending, organizing, and memorizing information presented in the form of graphic language text.

Another object of this invention is to provide a visual/spatial companion process to existing word processing systems. This would enable word processing to be used for both reading and writing.

Finally, another object of this invention is to provide an alternative method for teaching reading and writing.

SUMMARY OF THE INVENTION

The present invention method of textmapping may be used to produce one or more maps of a single textscape. By reading one or more mappings of a particular textscape, one may learn a great deal about the organization and content of that text, much as one may learn a great deal about a city by reading one or more maps of that city (for example, a ground elevation map, a road map, a bus route map, a tourism map, a parks and recreation map, a water map, a tax map, a sewer map, a political precinct map, a school district map, a fire district map, a zip code map, etc.).

Graphic, cartographic, and statistical methods may be used for mapping a textscape. By these methods, a textscape may be mapped with regard to any one graphic feature, or any combination of graphic features, just as a city may be mapped with regard to a single feature or any combination of features.

Textmapping can be used to gain an overview of an entire textscape, helping the reader or writer to see how the details relate to the larger context and thus to better comprehend or manage the whole. Textmaps make apparent the organization and flow of a text, guiding reading comprehension and helping with the process of structured writing.

Textmapping can be used for the teaching of reading and writing, as well as for the practice of reading and writing. Textmapping is well-suited to be adapted for use with electronic processing systems such as computers. It is especially suited for adaptation to word processing software, where it may be used for both reading and writing as a companion to existing word processing software systems.

Textmapping provides a means of shifting a greater part of the text processing burden back onto the page or screen, where individuals can make greater use of their visual and spatial cognitive abilities for reading and writing. And because it regards text as graphic information, textmapping also enables individuals to make far greater use of parafoveal and peripheral vision for reading and writing.

More generally, textmapping provides a means of reading text as visual information. This contrasts with current reading practice, which regards text as auditory information.

BRIEF DESCRIPTION OF THE DRAWINGS

FIG. 4 is a same-scale, detail-typographic, point-symbol, planimetric mapping of the fourth section of the same text (hereinafter, fourth section).

FIG. 5 is a same-scale, chorochromatic, planimetric mapping of the fourth section.

FIG. 11 is a small-scale, comprehensive, planimetric mapping of the original, full-sized image of the text.

FIG. 12 is an annotated copy of FIG. 11. The mapping of the annotations is a topologic, planimetric mapping of the original, full-sized image of the text.

DESCRIPTION OF THE PREFERRED EMBODIMENTS

Figure 1:
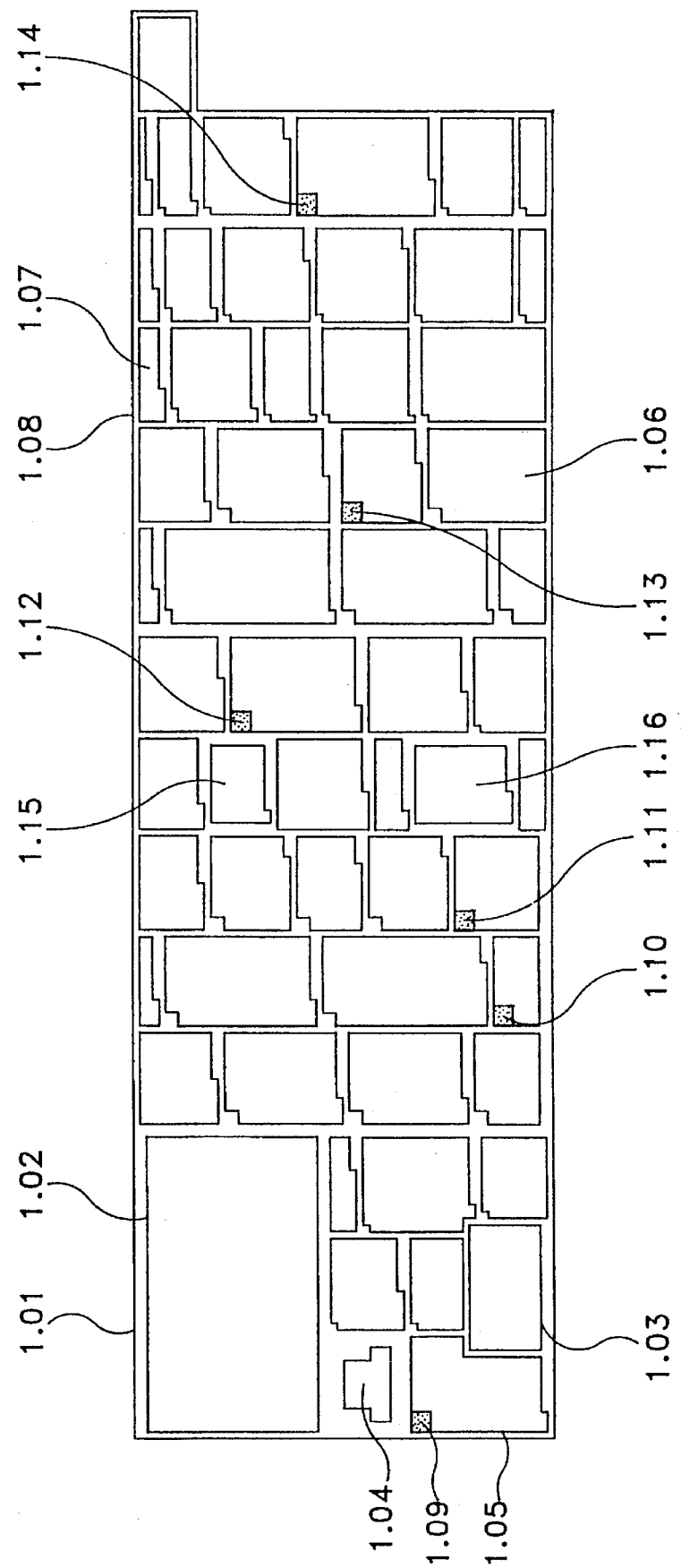
FIGS. 1 and 2 are different same-scale, base-typographic, planimetric mappings of the same hypothetical textscape (hereinafter, text).

The terms "read" and "reading" are used herein to refer to the process of perceiving, recognizing, decoding and comprehending graphic language.

The term "graphic language" is used herein to refer to all forms of written, pictorial, and schematic language, whether hand-made, machine made, electronically generated, or some combination thereof. The term "written language" is used herein to refer to all forms of written language, whether phonetic or non-phonetic in origin. The term "pictorial language" is used herein to refer to all forms of pictorial language, including maps, drawings, photographs and mosaics. The term "schematic language" is used herein to refer to all forms of schematic language, including charts, diagrams, and musical notation.

The term "graphic language features" as used herein, includes the following: punctuation marks, diacritics, special symbols, spacing, blank space, margins, background, illustrations, letter forms and other such graphemes and their allographs, namely grapheme strings (such as morphemes and words), strings of grapheme strings (such as phrases, clauses and sentences), blocks of grapheme-strings (such as paragraphs, headings, and captions), groupings of blocks of grapheme-strings (such as chapters, sections, and sub-sections) as well as any other graphic substance which is part of a graphic language text.

The term "graphic attributes" is used herein to refer to the visual attributes of a textscape and its graphic language features, such as size, shape, the presence or absence of color (including, for the purposes herein, black or white), brightness, intensity, density, and boldness, as well as any and all possible combinations of the above, such as gradations, blendings, and patterns. For example, the homophones "which" and "witch" may be easily distinguished by their word-profile, although some individuals may need to study more closely the individual letter-shapes which comprise the graphic whole before they can make such a distinction.

The term "phonetic attributes" is used herein to refer to the sound-based attributes of graphic language features. Phonetic attributes are only relevant in the case of written language features which symbolize encoded sound. Phonetic attributes are, for example, useful for distinguishing homographs such as "read" (present tense) and "read" (past tense).

The terms "meaning" and "usage" are used herein to refer to the structural relationships between specific graphic language features and the larger context in which they are found.

The term "meaning" refers to semantic meaning, including its two sub-categories: sense and reference. For example, the homonyms "frog" (amphibious creature), "frog" (device which keeps train wheels on the correct track where rail lines intersect or branch-off), and "frog" (part of the sole of a horses foot) are distinguished in that they refer to different objects. To determine which meaning (i.e. reference) is intended, one must consider the larger meaning (i.e. sense) of the context.

The term "usage" refers to grammatical usage, including its three sub-categories: morphology, classification, and syntax. For example, the homonyms "smell" (the noun) and "smell" (the verb) may be distinguished on the basis of the way they are used (i.e. their functional classification) in a sentence.

The term "display" is used herein to refer to any and all means of displaying graphic language.

The term "text" is used herein to refer to a body of graphic language which has a definable message or communicative function.

The term "textscape" (c.f. "landscape") is used herein to refer to the graphic language features, considered in the aggregate, of one or more texts, or to the portion of one or more texts which the eye can comprehend in a single view.

The term "typography" is used herein to refer to the graphic attributes and configuration of a textscape, as well as to the graphic attributes of the individual graphic language features in a textscape.

The term "base-typographic map" is used herein to refer to a map which shows all or part of one or more of the following elements of a textscape's typography: outline, major and minor divisions, configuration, and major features. The base-typographic structure of a textscape is analogous to the common cartographic notion of administrative structure.

The term "detail-typographic map" is used herein to refer to a map which, within the context of a base-typographic map or a selected portion of a base-typographic map, shows all or some instances of one or more of the graphic language features of a textscape. In practice, the distinction between a base-typographic and a detail-typographic map is not always clear-cut, in part because the definition of "major features" is, by necessity, a relative one which depends upon scale. For example, base-topographic features in the context of a county map are likely to be considered detail-topographic features in the context of a map of the entire United States. Thus, the distinction between a base-typographic map and a detail-typographic map depends, in part, upon the area of the textscape in question and the scale of the display.

The terms "small-scale map", "same-scale map" and "large-scale map" are used herein to refer to textmaps in terms of their size relative the textscape which they represent. A small-scale map is smaller than the textscape which it represents, a same-scale map is the same size as the textscape which it represents, and a large-scale map is larger than the textscape which it represents. While this is quite different from the standard geo-cartographic definition of the terms "small-scale" and "large-scale" it does make sense in the context of text-cartography. Unlike a standard geographic map, which almost by definition is smaller than the landscape which it represents, a map of a textscape may be larger than, the same size as, as well as smaller than, the textscape which it represents. In this sense, the concept of scale in textmapping is better understood by analogy to models than by analogy to standard geographic maps.

On the other hand, unlike models or landscapes, a text has no fixed size. For example, many different copies of a novel may be published, some as hardcover books with large pages typeset in a large point-size, some as paperback books with small pages typeset in a small point-size, and some on CD-ROM in which case the text may never have a "size". In this sense, the concept of scale in textmapping is far removed from the notion of scale as applied to the physical world.

The term "point-symbol map" is used herein to refer to a particular type of distribution map. A point-symbol map shows the spatial distribution of two or more classes of features by using a different symbol or by assigning different graphic attributes to a common symbol such as a dot to represent each class of feature. Then for each instance of any given feature, one of that feature's corresponding symbols is placed at the appropriate location on the map. A point-symbol map is similar to a dot-distribution map, except a dot-distribution map is limited to showing the distribution of only one class of features (by virtue of the fact that all dots look alike), a point-symbol map can show two or more classes of features.

The terms "chorochromatic map" and "color-patch map" are used interchangeably herein to refer to maps which, by means of coloring, shading or other related methods such as stippling or hatching, illustrate areal dimensions and spatial distributions within the context of base-typographic structure. Chorochromatic maps do not indicate information of a quantitative nature. The term "color-patch map" is commonly used to refer to all such maps, regardless of whether they are in color, or in black and white.

The term "daysymetric map" is used herein to refer to a map which, like a chorochromatic map, uses coloring, shading or other related methods such as stippling or hatching to illustrate areal dimensions and spatial distributions, but does so independent of horizontal base-typographic boundaries. A daysymetric map may also be used to indicate information of a quantitative nature. This definition of a daysymetric map differs slightly from the standard geo-cartographic definition in that areas within a daysymetric textmap remain constrained by the existing vertical base-typographic boundaries even as they are free to flow across horizontal base-typographic boundaries. In a daysymetric geographic map, by comparison, areas are free to flow across existing administrative boundaries in all directions. This distinction between daysymetric textmaps and daysymetric geographic maps makes sense in light of the fact that text is a linear medium, and textmaps reflect that linearity. In our culture, the linearity of text is reflected by the directional configuration of our written language such that it is meant to be written and read in a pattern which is commonly described as "left-to-right, top-to-bottom." Landscapes and landforms, by comparison, are not linear. Unlike a textmap, a geographic map has no "beginning point" and no "end point". Unlike a textmap, a geographic map may be read in any direction. There is no way to read a geographic map "forwards" or "backwards".

The term "planimetric map" is used herein to refer to a map which represents a textscape as a flat, two-dimensional plane. Inasmuch as text is usually displayed as a flat, two-dimensional medium, it is reasonable to expect that the practice of textmapping will, at least initially, be most easily understood within the context of planimetric mapping.

The term "statistical map" is used herein to refer to a textmap which is based upon the treatment of text typography and/or graphic language features as statistical data. A detailed description of statistical textmapping, including definitions of its related terms, appears below, following the discussion of FIG. 5.

The term "comprehensive map" is used herein to refer to a textmap which is based upon at least one individual's comprehension of the rhetorical, semantic, thematic, and/or conceptual configuration(s) of a text.

The term "relief map" is used herein to refer to a map which represents a textscape as a three-dimensional surface. Examples include typographic-relief textmaps, large-scale relief textmaps, point-symbol relief textmaps, chororchromatic-relief textmaps, daysymetric-relief textmaps, statistical-relief textmaps, and comprehensive-relief textmaps.

The term "topologic map" is used herein to refer to a map which accurately represents the spatial ordering and relative positions of the different elements and features of a textscape, but does not accurately represent shape or linear dimensions.

There are as many different kinds of textmaps as there are maps in general, and it would not be practical to attempt to describe them all in this application. Moreover, there are as many different ways of using textmaps as there are ways of using maps in general, and it would not be practical to attempt to describe all of them in this application. The following illustrations should serve, however, to illustrate the basic principles of textmapping.

Referring to FIG. 1 is shown a same-scale, base-typographic, planimetric map of a hypothetical textscape (hereinafter, text). While the text itself is not shown in FIG. 1, the simultaneous display of a text and its corresponding textmap(s), whether by sequential display, superimposition, juxtaposition, or animation, is included in the scope of this application. The textscape mapped in FIG. 1 is a reduced-size image of an original text. The textmap in FIG. 1 was drawn directly on this textscape (i.e. the reduced-size image), thus it is considered a same-scale mapping. The text used to create the textscape can be taken from any source such as a news paper, magazine, book or the like. The textscape can be physically created in many different ways. For example, the text of a book can be photocopied in reduced format and taped together. Similarly, text can be scanned into a computer and printed in a reduced landscape format as part of a continuous roll.

The textscape occupies only about seven percent of the area occupied by the original text. The image is so small that it is not possible to read the words of the text as sound information, but it is not so small as to preclude the reading and mapping of the major features of the textscape as graphic information. Some of those major features are identified in FIG. 1 as follows.

Line 1.01 traces the outline, and thus describes the areal extent of the text. Within the confines of line 1.01, lines 1.02 and 1.03 demarcate areas occupied by illustrations. Line 1.04 demarcates the area occupied by the title and sub-title of the text. Each of the paragraphs in the text is demarcated by a line, such as line 1.05. Where paragraphs are interrupted by the end of a column, as shown by block area 1.06, and thus where the balance of the paragraph is continued starting at the top of the next column to the right, as shown by block area 1.07, the carry-over is indicated by the absence of an indentation in the upper left corner of the carry-over block area, as shown by block area corner 1.08.

The six small dark block areas 1.09–1.14 each indicate the location of an oversized alphabetic character. Each of these six large alphabetic characters is of the same typeface style and point size, as indicated in this case by the fact that each of block areas 1.09–1.14 are of the same size and color. However, when compared to almost all of the other the alphabetic characters in the text, these six alphabetic characters stand out conspicuously by virtue of their much larger point size and their unique typeface style. This is why, in the context of this particular textscape, they qualify as major typographic features. In this case, block areas 1.09–1.14 indicate the presence of section markers, i.e. typographic cues marking points of transition in the text. Typographers commonly use typeface style and point size in this way to mark important transitions in a text. Similarly, block areas 1.05 and 1.06 describe the location and areal extent of text blocks which were set by the typographer in a narrower column width. This is also a common typographic convention used to distinguish the main body of the text from those text portions which are comprised of quoted material. Quotations of more than a sentence or two are often thus distinguished, and are commonly referred to as "block quotations".

The textmap in FIG. 1 contains no alphabetic characters. Consequently, the use of foveal vision is not necessary to read this textmap. Moreover, this textmap contains no sound information, which means that with regard to reading, auditory processing ability is of no use, and sequential processing ability is of only minimal use. This textmap may, however, be easily read by using parafoveal and peripheral vision and visual and spatial processing.

By reading FIG. 1, the individual will learn much about the text which it represents. FIG. 1 provides a means of instantaneously comprehending the length and structure of the text, as well as the flow of information within it. The length of the text is represented by the areal dimensions of the textmap. The structure of the text is represented by the division of the textscape into block-areas: the title, two illustrations, six sections and 41 paragraphs, with the 41 paragraphs unequally divided among the six sections. The flow of information is represented by the way in which paragraphs and sections of varying lengths are strung together.

The fact that the typographer has divided the text into six sections is useful information. The reader can use this information to help determine where to go in the text to find particular kinds of information. The reader can also use this information to help with structure comprehension. In short, the relative location, dimensions, configuration and major typographic features of each section are clues on the basis of which the reader may draw inferences regarding the significance, length, complexity, and content of each section.

Figure 2:
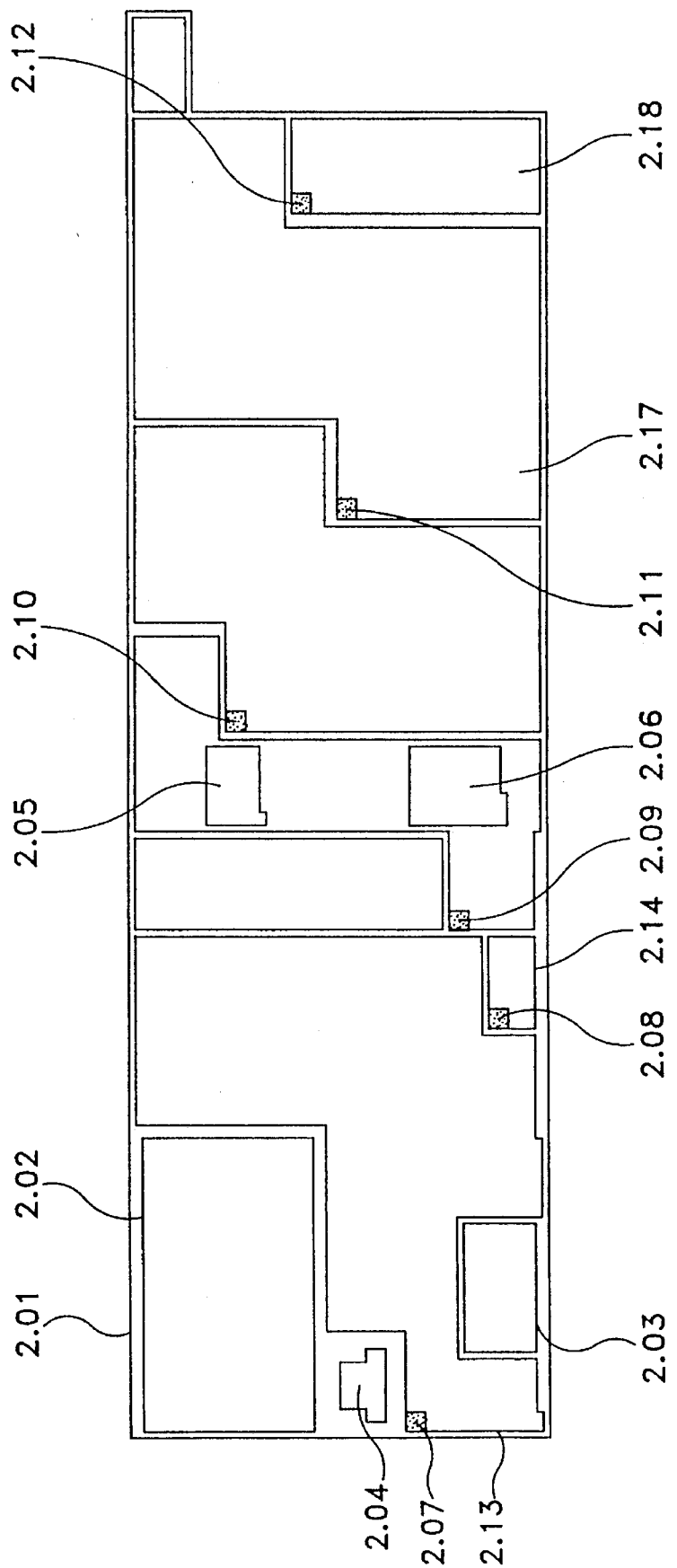

FIG. 2 is, like FIG. 1, a base-typographic map. While both maps are of the same text and are drawn in the same scale, they differ somewhat in their representation of the text's base-typography.

FIGS. 1 and 2 have in common the following features. Both show the boundary line of the text (line 2.01 in FIG. 2). Both show two areas occupied by illustrations (block areas 2.02 and 2.03 in FIG. 2). Both show the area occupied by the title and sub-title of the text (block area 2.04 in FIG. 2). Both show the two block quotations (block areas 2.05 and 2.06 in FIG. 2). Finally, both show the six small dark blocks (block areas 2.07–2.12 in FIG. 2.0), each of which represents a single alphabetic character marking the beginning of a new section of the text.

FIG. 2 differs from FIG. 1 in that it does not show the paragraph configuration of the text. Instead, it focuses upon the section configuration as defined by the small dark block areas 2.07–2.12 and lines 2.03–2.08.

Figure 3:
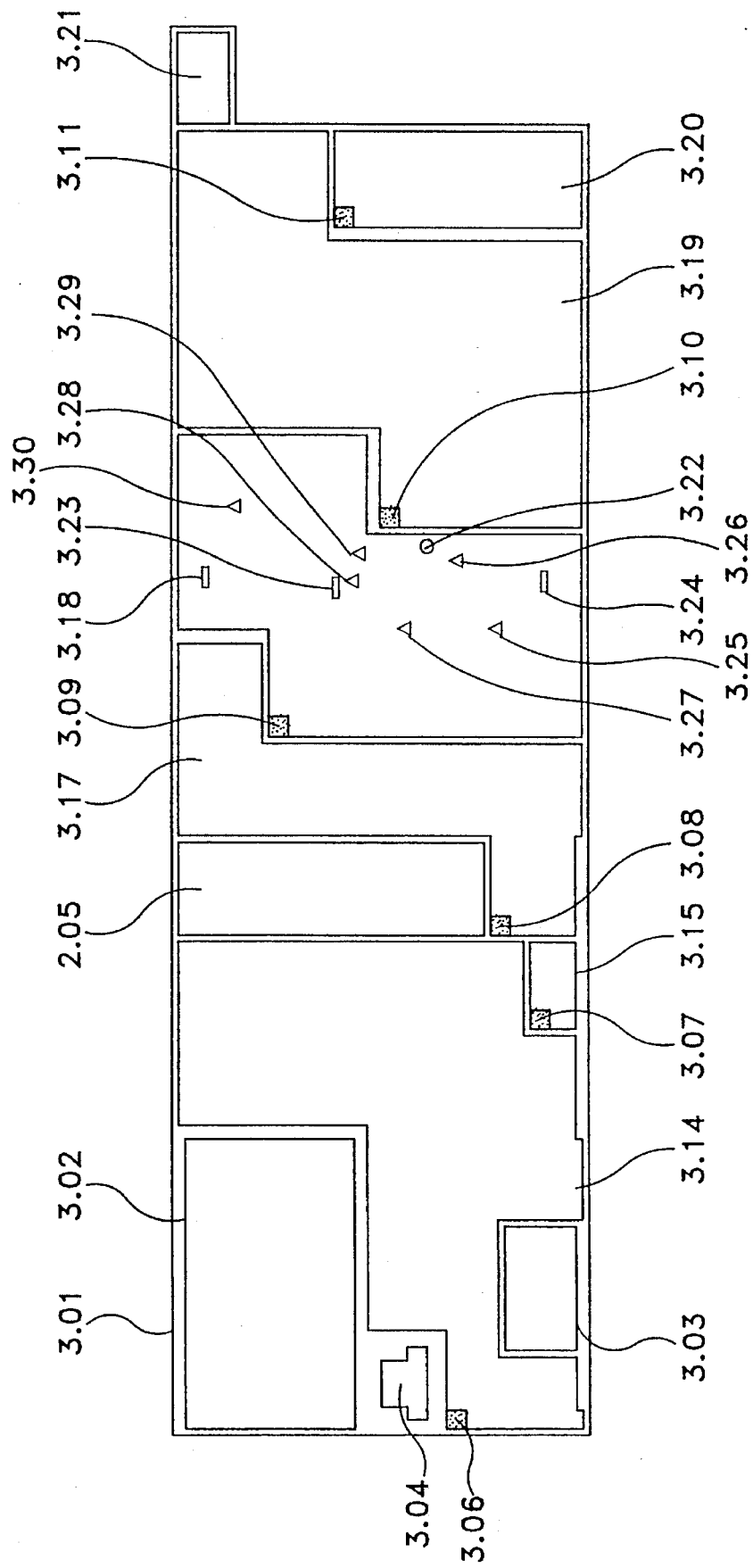
FIG. 3 is a same-scale, detail-typographic, point-symbol, planimetric mapping of the same text.

FIG. 3 is a same-scale, detail-typographic, point-symbol, planimetric mapping of the same text in FIGS. 1 and 2. FIG. 3 has in common with FIG. 2 the following features. Both show the boundary line of the text (line 3.01 in FIG. 3). Both show two areas occupied by illustrations (block areas 3.02 and 3.03 in FIG. 3). Both show the area occupied by the title and sub-title of the text (block area 3.04 in FIG. 3). Finally, like FIG. 2, FIG. 3 shows the section configuration of the text, as indicated by the section markers represented by block areas 3.06–3.11. For example, block area 3.06 indicates the beginning of the section represented by block area 3.14. Similarly, block area 3.07 indicates the beginning of a section represented by block areas 3.15 and 3.16. Block area 3.16 represents the continuation of the text begun in block area 3.15 into a new text column.

FIG. 3 differs from FIG. 2 in that it does not show the two block quotations (block areas 2.05 and 2.06 in FIG. 2.0). More importantly, FIG. 3 maps the textscape with reference to each instance of the graphic language features "house", "houses", and "housing". The location of each instance of "house" is indicated by a small oval (3.22); the location of each instance of "houses" is indicated by a small rectangle (3.23 and 3.24); and the location of each instance of "housing" is indicated by a small triangle (3.25–3.30).

The most obvious information provided by this mapping concerns the location of the features house/houses/housing. All are located within the boundaries of the section of text which begins with block area 3.09. None of the other block areas contains a single instance of any of these three features. On the basis of this information, one might logically infer that the topic of house/houses/housing is discussed in this section, and that it probably is not discussed anywhere else in the text.

Another piece of information provided by the mapping in FIG. 3 concerns the distinction between the topic "houses" the topic "house" and the topic "housing". In FIG. 3, "house", "houses", and "housing" are each symbolized differently. Because the distinction between these three features is noted on the map, it can be clearly seen that there are six instances of "housing", two instances of "houses", and one instance of "house". Moreover, these instances do not appear to be clustered or segregated in any way which would suggest that "houses" is specific to one location, "housing" to another, and "house" to yet another. On the basis of this information, one might reasonably infer that the sense of house/houses/housing in this context is most closely related to the general topic "housing" (which appears six times) and not to the general topics "houses" (which appears two times) or "house" (which appears only one time).

FIG. 3 does not, however, provide information regarding the relative importance of the topic "housing". The fact that "housing" is discussed is clear. The fact that it is an important topic, or even the main topic, within the context of the section is not clear. The most that can be said is that FIG. 3 shows that the features house/houses/housing do appear in this text, and that they are concentrated in, and thus probably specific to, only a portion of the section in question.

This can be more easily seen in the context of the paragraph configuration of the section, as shown in FIG. 4. FIG. 4 is a same-scale, detail-typographic, point-symbol, planimetric map which shows only the section in question (i.e. the section identified by block area 3.18 in FIG. 3). FIG. 4 combines typographic information about the section from FIGS. 1 and 3. In FIG. 4, line 4.01 is the outline or boundary of the section. Block area 4.02 is the small block representing the large typeface character which marks the beginning of the section. Block areas 4.03–4.09 are the seven paragraphs in the section. Block area 4.10 is the continuation of the paragraph identified by block area 4.05. Finally, block area 4.11 is the continuation of the paragraph identified by block area 4.08. As in FIG. 3, FIG. 4 marks the location of each instance of "house" with a small oval (4.12), each instance of "houses" with a small rectangle (4.13 and 4.14), and each instance of "housing" with a small triangle (4.15–4.19). Thus, FIG. 4 clearly shows that the section in question contains within its boundaries seven paragraphs, only three of which contain one or more instances of "house", "houses", and "housing".

On the other hand, FIG. 4 provides no information about the content of the "empty" locations, namely, block areas 4.03–4.05 and 4.09–4.10, all but three words in block area 4.06, all but four words in block area 4.07, and all but one word in each of block areas 4.08 and 4.11. It should be noted here that both FIGS. 3 and 4 fail to provide this information, but the significance of this failure is more clearly seen in the context of the paragraph configuration shown in FIG. 4.

FIG. 5 is a same-scale, chorochromatic, planimetric mapping of the fourth section. In FIG. 5, line 5.01 is the outline/boundary of the section, block area 5.02 is the small block representing the large typeface character which marks the beginning of the section, block areas 5.03–5.09 are the seven paragraphs in the section, block area 5.10 is the continuation of the paragraph identified by block area 5.05, and block area 5.11 is the continuation of the paragraph identified by block area 5.08.

Unlike FIG. 4, which indicates the specific location of each instance of house/houses/housing by means of point-symbols, FIG. 5 simply indicates the presence or absence of "house" in a paragraph by the presence or absence of vertical hatching, the presence or absence of "houses" by the presence or absence of horizontal hatching, and the presence or absence of "housing" by the presence or absence of backward slanting oblique hatching.

Like FIG. 4, FIG. 5 clearly shows that the section in question contains within its boundaries seven paragraphs, only three of which contain one or more instances of "house", "houses", and "housing". FIG. 5 is also similar to FIG. 4 in that it fails to provide information about the content of the "empty" locations. It differs, however, from FIG. 4 in that in generalizing the location of house/houses/housing to whole block areas (the existing base-typographic structure), FIG. 5 obscures the fact that there are empty locations within the boundaries of block areas 5.06–5.08, and 5.11. Finally, like FIG. 4, FIG. 5 does not provide any information about the significance of house/houses/housing in the context of the section. It merely identifies those paragraphs in which the features house/houses/housing occur as well as those paragraphs in which house/houses/housing do not occur.

With regard to the empty locations, it is important to consider the possibility that the information not mapped (i.e. the information which exists in the empty areas) is more important than the information already mapped (i.e. the nine instances of house/houses/housing). The problem is to find a way to get at and sort through the information in the empty areas without having to use foveal vision and auditory and sequential processing, i.e. without having to read the words of the text. One way of accomplishing this is to treat the graphic features of a text as statistical spatial data, and to employ statistical techniques to sort, classify, and select for mapping only those graphic language features which are likely to yield useful and relevant information about the text.

When practiced, as in FIGS. 3–5, detail-typographic textmapping is a literal process concerned only with the description of details in terms of their location within the larger spatial context. Such textmaps make no interpretive distinction between significant and insignificant features. A feature may be mapped simply because it exists.

Statistical textmapping, in contrast, is an interpretive process. The essential factors considered in statistical textmapping are frequency and location. The secondary factors considered are graphic attributes, phonetic attributes, meaning and usage. (The terms "graphic attributes", "phonetic attributes", "meaning", and "usage" are all defined above in the definitions section at the beginning of The Description of the Preferred Embodiments).

Frequency is defined herein as the number of instances of a certain feature and may be expressed in terms of a number, a percentage, or a ratio. Location is defined herein as being the location of each instance. The parameters of a location are definable as either a point or a zone. A zone is defined as any area larger than a point, such as the area occupied by the feature itself or the area occupied by a phrase, a clause, a sentence, a paragraph, a section, a chapter, an entire text, or a collection of texts.

Information about frequency and location may be combined to produce information regarding a selected feature's distribution ("Does the feature appear more or less evenly throughout the text?"), specificity ("Does the feature appear in one area of the text?"), and spread ("Can the influence of the feature be said to extend over a particular zone?"). Distribution is analogous to the cartographic concept of dispersion. Specificity and spread are, respectively, analogous to the cartographic concepts of concentration and continuity. Information about frequency and location may also be combined with information about graphic attributes, phonetic attributes, meaning, and/or usage. The result of which is a more refined representation of the specificity, distribution, and spread of selected features within a text.

Figure 6:
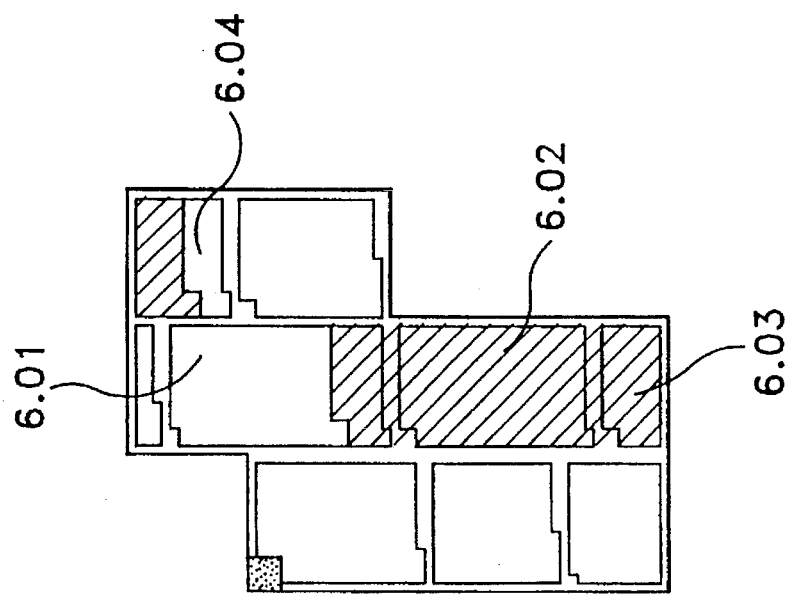

FIGS. 6–10 are different same-scale, statistical, daysymetric, planimetric mappings of the same section mapped in FIGS. 4 and 5. FIG. 6 illustrates the concept of spread with regard to the features "house", "houses", and "housing". For present purposes, the features "house", "houses", and "housing" are treated in FIG. 6 as a single feature, namely "housing". The parameters for spread are defined in FIG. 6 as follows. The spread of a feature is continuous as long as the feature appears in two or more sequentially contiguous paragraphs. The outer limits of the spread are delimited by the first and last instances of the feature in question. Thus, the spread of "housing" is shown by backward slanting oblique hatching which defines an area which begins in the lower quarter of block area 6.01, flows across the horizontal boundary between block areas 6.01 and 6.02, occupies all of block area 6.02, flows across the horizontal boundary between block areas 6.02 and 6.03, occupies all of block area 6.03, flows across the column break at the bottom of block area 6.03 and continues up and to the right to flow down into block area 6.04. Finally, after occupying the upper two-thirds of block area 6.04, it ends.

FIG. 6 demonstrates one way in which statistical textmapping may be used. There still remains, however, the problem of getting at and sorting through the information in the empty areas (as discussed with respect to FIGS. 4 and 5, above) without having to read the words of the text. One way of accomplishing this is to assemble a list of all instances of every graphic language feature in a text and to employ statistical techniques to analyze each graphic language feature on the list on the basis of its frequency, location, graphic attributes, phonetic attributes, meaning, and/or usage. This approach enables one to sort, classify, and select for mapping only those graphic language features which are likely to yield useful and relevant information about the text.

For example, in the case of the text represented by FIGS. 1–3, (the fourth section of which is represented by FIGS. 6–11), there are 4,425 different words and a total of 7,549 word instances. Of the 4,425 words, 3,720 (roughly 84%) of them occur only one time in the text. The remaining 3,829 word instances (7,549–3,720=3,829) are attributable to only 705 of the words in the list. The most frequent word is "the" which occurs 387 times. The word "of" appears 190 times, "a" appears 114 times, and "and" appears 90 times. A similar listing of punctuation marks shows that there are, for example, 242 commas, 145 periods, and 16 question marks.

Figure 7:
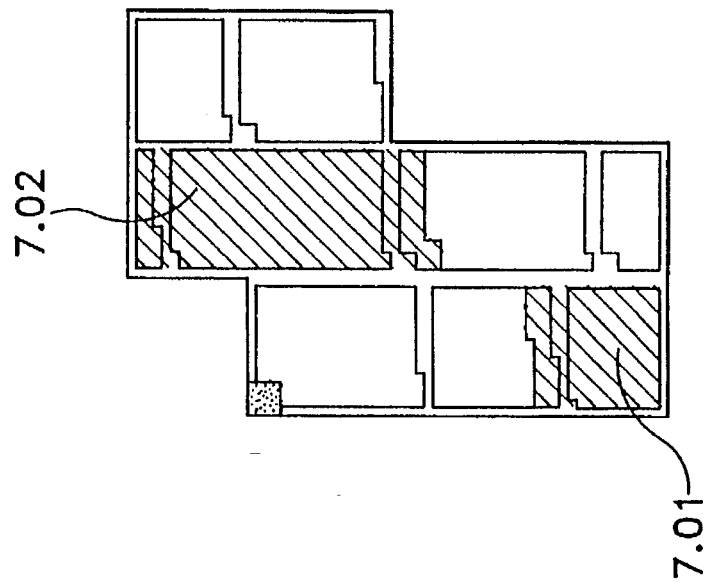
FIGS. 6–10 are different same-scale, statistical, daysymetric, planimetric mappings of the fourth section.
Figure 9:
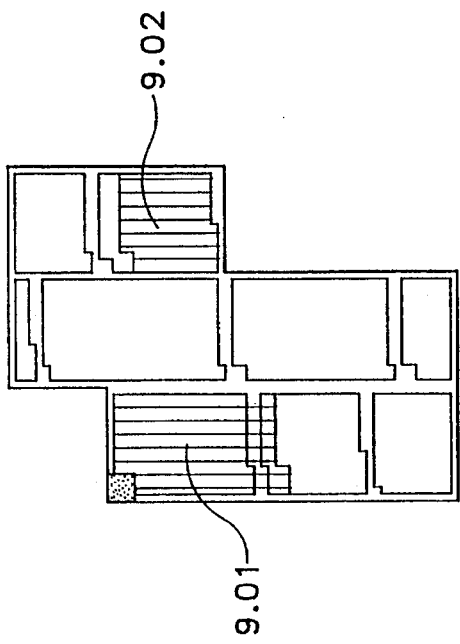
Figure 8:
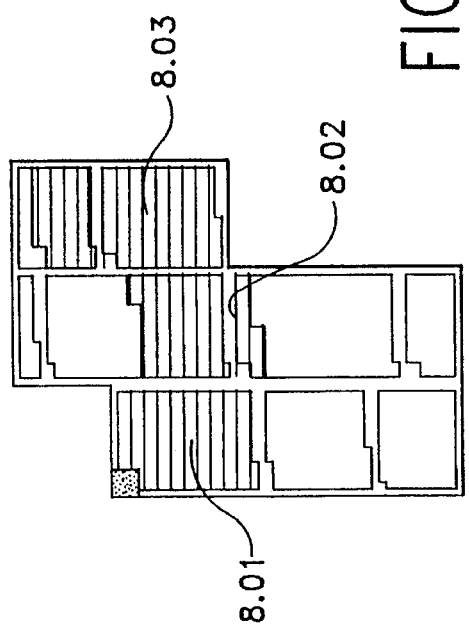

In order to select the features to be mapped in FIGS. 7–9, a list of all words appearing in the text was compiled, and the frequency of each was noted. The word count list was then ranked in descending order on the basis of frequency.

Then each word was classified on the basis of its possible usage. The term "possible usage" is used here because it is often difficult to determine, out of context, the usage of a particular word. For example, the word "houses" means one thing when used as a noun, and another thing when used as a verb.

Next an attempt was made to categorize, under the heading of a dominant word, those different words which appeared to be related. Words were determined to be related on the basis of their graphic attributes and/or possible meaning. Where two or more words were determined to be related, the word having the highest ranking on the basis of frequency was declared the dominant word. Among the graphic attributes considered were similarities in graphic structure, (i.e. "house", "houses" and "housing" all have in common the graphic-root "hous"). The term "possible meaning" is used here because it is often difficult to determine, out of context, the meaning (reference) of a particular word.

Then each word was classified on the basis of its location in the text. Because FIGS. 7–9 represent only the fourth section of the text, all those words which do not appear in the fourth section were automatically excluded from consideration.

With the above information in hand, a search of the word count was initiated to find the dominant form of the four most frequent possible nouns appearing in the fourth section of the text. It should be noted here that there is a difference between those words which appear in the fourth section, and those words which appear only in the fourth section. In the present example, the search did not exclude words which appear elsewhere in the text. It is often, however, worth the extra effort to map a location from both perspectives and to compare the two mappings.

The search of the word count resulted in selection of four words to be mapped: word #1 (frequency: 12), word #2 (frequency: 9), word #3 (frequency: 7), and word #4 (frequency: 5). Each of these words was mapped in terms of its spread. The parameters for spread were the same as the parameters used in FIG. 6. Word #2 is mapped in FIG. 6. Word #1 is mapped in FIG. 7, word #3 is mapped in FIG. 8, and word #4 is mapped in FIG. 9. The spread of word #1 is represented in FIG. 7 by forward slanting oblique hatching. The spread of word #3 is represented in FIG. 8 by vertical hatching. The spread of word #4 is represented in FIG. 9 by vertical hatching also.

FIGS. 7–9 are "blind mappings" in that they do not provide any information about the words, other than their spread. This information, however, is very useful. For example, FIGS. 6 and 7–9 may all be equally regarded (blind or not), by analogy to Venn Diagrams, as Venn sets. In FIG. 6, the area defined by backward slanting oblique hatching represents the Venn set containing all instances of "housing". In FIG. 7, the forward slanting obliquely hatched area comprised of hatched areas 7.01 and 7.02 (considered here as one area because 7.02 is a continuation of 7.01) is the Venn set containing all instances of word #1. In FIG. 8, the three separate horizontally hatched areas 8.01–8.03 represent three different locationally—specific Venn which in the present illustration are regarded as a single spatially divided Venn set containing all instances of word #3. In FIG. 9, the two separate vertically hatched areas 9.01 and 9.02 represent two different locationally specific Venn sets which in the present illustration are regarded as a single spatially divided Venn set containing all instances of word #4.

The Venn sets represented by FIGS. 6–9 can be compared in much the way that Venn sets are commonly compared in Venn diagrams. One can look for those areas in which all of the Venn sets intersect, in which some of the Venn sets intersect, in which none of the Venn sets intersect, or in which there are no Venn sets at all. For those areas in which only some of the Venn sets intersect, one can look to see which of the Venn sets are included in the intersection.

Before reading the detailed description which follows, it is strongly recommended that the reader of this application first read FIGS. 6–10 as they are meant to be read: as visual spatial information, i.e. as visual images, independent of sound. Arguably, this warning should have been issued much earlier in this application, but it is especially applicable to the description which follows. Written language is a poor medium for describing images. There is no better description of an image than the image itself. While the figures, being graphic images, which are part of this application can be comprehended instantaneously, as visual spatial information, the written text of this application, of which this sentence is a part, can only be comprehended sequentially, as auditory temporal information. This patent application concerns reading as a visual spatial process. As such, it is best understood by means of visual spatial cognition. It is strongly recommended that you read the maps before reading the description below.

Figure 10:
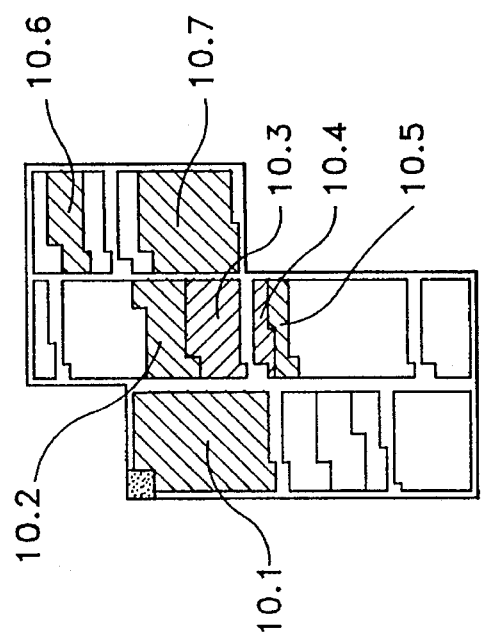

FIG. 10 shows the intersections of the Venn sets represented by FIGS. 6–9. Block areas in which two Venn sets intersect (block areas 10.01, 10.02, 10.05, 10.06, and 10.07) are represented by widely spaced forward slanting oblique hatching. Block areas in which three Venn sets intersect (block areas 10.03 and 10.04) are represented by finely spaced cross-hatching.

On the basis of the mapping in FIG. 10, one might reasonably infer that block areas 10.03, 10.04, 10.01, and 10.07 are most likely to provide the reader with a quick and accurate overview of the subject discussed in the section. That the overview may be comprehended quickly is suggested by the fact that the information is in visual form, and that the total area occupied by block areas 10.03, 10.04, 10.01, and 10.07 is only about a third of the area occupied by the section as a whole. It is reasonable to expect that if one's goal is to gain an overview of the section, one will save a considerable amount of auditory-based reading time by going first to these four block areas. The fact that the overview is likely to be accurate is a matter of probability based upon the multivariate statistical analysis described in the above text and in FIGS. 6–10. The results of this analysis show the following. Block areas 10.03 and 10.04 represent the only locations in the section in which three Venn sets intersect. Block areas 10.01, 10.02, 10.05 and 10.06 are all similar in that they represent the intersection of two Venn sets. Block areas 10.01 and 10.07, however, by virtue of their locations within the first and last paragraphs of the section, are more likely to be useful with regard to establishing a general understanding of the subject discussed in the section than are block areas 10.02, 10.05, and 10.06. If, after reading the text which appears in block areas 10.03, 10.04, 10.01, and 10.07, further information is needed, a reasonable next step, based upon the above analysis of Venn intersections and locations, would be to read the text which appears in block areas 10.02, 10.05, and 10.06.

FIGS. 6–10 also provide a means of determining which of the four words (word #1, word #2, word #3, and word #4), is most likely to accurately describe the subject which serves as the main point of the section. Visual comparison of FIGS. 6–10 reveals that block areas 10.03 and 10.04 represent the intersection of the Venn sets containing word #3, word #2, and word #1. Block areas 10.01 and 10.07 represent the intersection of the Venn sets containing word #3 and word #4. Block area 10.02 represents the intersection of Venn sets containing word #1 and word #3. Finally, block areas 10.05 and 10.06 represent the intersection of the Venn sets containing word #2 and word #3.

Because it is the only Venn set which is common to all of the Venn intersections, word #3 is most likely to be the word which accurately represents the general subject matter of the section. This is so despite the fact that word #3 appears fewer times than either word #1 or word #2. Word #4 is likely to be nearly as important as word #3 inasmuch as it appears, along with word #3, in the first and last paragraphs of the section. Word #4 is found only at the beginning and end of the section. Word #2 and word #1 are likely to represent related sub-topics or important examples.

The above inferences form a kind of structure, a visual, spatial structure, which the individual may use to guide his/her reading of the word information in the text. Word #1 is "manufacturing", word #2, as already revealed, is "housing", word #3 is "wages", and word #4 is "labor". Having pre-read the text as graphic information, the individual might begin reading the words of the text as sound information with the intention of testing the inferences arrived at by means of the textmapping process. The most important inference is that the main topic of the section is labor wages in the housing and manufacturing industries.

Statistical textmapping is a powerful tool for decoding and comprehending graphic language texts. It may be used for a variety of word processing tasks, for both reading and writing. For example, it may be used to map a text for concepts, arguments, information, and the like, or to reveal the structure, organization, and flow of information and concepts within a text.

By comparing maps and looking for intersections of visual Venn sets, the reader may, without actually reading the words of the text as sound information, determine which locations are most likely to yield the main point of a text, which locations are most likely to contain specific details or more developed arguments, and which locations are likely to contain minor details, information of secondary importance, or digressions from the main point. Heavily intersected locations will usually yield the most general information. Locations which contain very few, or zero, Venn intersections are less likely to contain general information. They are, however, more likely to contain specific kinds of information, such as details, arguments, documentation and supporting quotations, that are interesting but, with regard to the main point of the text, are irrelevant or insignificant digressions.

Ultimately, each individual reader and writer is responsible for deciding what is, and what is not, relevant to any given text. Relevance is critical to comprehension. Comprehension requires a conceptual leap across the gap between literal understanding and interpretive understanding. In the final analysis, true comprehension of phonetically-based written language texts can not be achieved in the absence of sound. Textmapping provides a set of tools which can be used to help individuals read such texts as visual, spatial information, but textmapping can not change the fact that true comprehension of phonetically-based written language texts ultimately depends upon auditory-based reading technique. This does not mean, however, that textmapping can not be used to supplement auditory-based reading.

FIG. 11 is a small-scale, comprehensive, daysymetric, planimetric mapping of the "original", full-sized image of the text, the reduced image of which is represented by FIGS. 1–3. FIG. 11 is drawn to the same scale as the reduced image represented by the other figures discussed herein so as to facilitate the visual comparison of FIG. 11 with said other figures.

FIG. 11 represents one individual's inferences as to the possible thematic/subject divisions within the text, based upon an auditory reading of the first sentence of each paragraph in the text. The notion that one might gain an initial understanding of a text by reading the first sentence of each paragraph, is far from controversial. In fact, it is a pre-reading technique which has, for many years, been widely taught in our schools. FIG. 11 shows how textmapping may be used as a visual, spatial companion process to such standard auditory-based reading techniques.

In FIG. 11, the possible thematic/subject divisions are shown within the context of certain elements of the base-typography borrowed from FIG. 2. FIGS. 11 and 2 have in common the following features. Both show the boundary line of the text (line 11.01 in FIG. 11). Both show two areas occupied by illustrations (block areas 11.02 and 11.03 in FIG. 11.). Both show the area occupied by the title and sub-title of the text (block area 11.04 in FIG. 11.0). Finally, both show the six small dark blocks (block areas 11.05–11.10 in FIG. 11.), each of which represents a single alphabetic character marking the beginning of a new section of the text.

The possible thematic/subject divisions are represented by the configuration of the textscape into block areas 11.11–11.21, each of which is distinguished from its neighbors by the presence or absence of cross-hatching. The absence, presence, or tilt direction of the cross-hatching is not, in and of itself, significant in this mapping. It simply is a convenient method of providing sufficient visual contrast so as to make each individual thematic/subject block area clearly visible.

Block area 11.19 is the continuation of block area 11.11. Block area 11.20 is the continuation of block area 11.14. Finally, block area 11.21 is the continuation of block area 11.18. Thus, it can be clearly seen that on the basis of one individual's reading of the first sentence of each paragraph, the text can be divided into 8 block areas. Each of these block areas represents a zone in which one could expect to find information which, while perhaps related to the main topic of the text as a whole, may be more narrowly focused upon a specific aspect of the main topic or upon a theme or subject of secondary importance.

It is worth noting that the possible thematic/subject configuration, as shown in FIG. 11., matches the section configuration in some places and does not match it in others. The section beginning with block area 11.05 is divided into three thematic/subject zones, 11.11–11.19, 11.12, and 11.13. These three zones fit neatly within the confines of the section. This is useful information. This section is one of the longest sections in the text, and many readers, especially learning disabled readers, would be relieved to see such a long section subdivided into smaller, and possibly more manageable chunks. Moreover, because it is the first section, one might expect that it contains introductory information. The subdivision of the introductory section into three zones provides important clues as to the complexity of the subject matter to be discussed, as well as to the number of related sub-themes/subjects which might be addressed.

It is also worth noting that, except for thematic/subject zone 11.15, all of the other thematic/subject zones conform to the existing section configuration. Thematic/subject zone 11.15 begins near the end of the section which begins with block area 11.06, immediately following thematic/subject zone 11.14–20. However, instead of stopping at the end boundary of the section, it flows over the end boundary line and occupies all of the section beginning with block area 11.07. This kind of information suggests the possibility that the boundary between these two sections may not be as firm as the other section boundaries in the textscape. This is useful information which the reader may use to guide their further reading.

FIG. 12 is an annotated copy of FIG. 11. In this case, the annotation is in handwritten American English. Any graphic language may be used, however, to annotate a textmap. This is an example of a textmap being used as a record summarizing one's comprehension of a written language text. In this sense, the textmap in FIG. 12 serves the same purpose as a written language outline, synopsis, or summary, but it does so in a form which enables the individual to structure comprehension and recall visuospatially, i.e. by using the graphic image of the textscape as a visual, spatial outline, synopsis, or summary of text.

In FIG. 12, there is a corresponding notation for each of the eight thematic/subject zones (12.01–12.08) originally identified in FIG. 11 (of which FIG. 12 is a copy). Moreover, the annotations are themselves mapped to reflect a certain understanding of the text's general compositional structure. The designation "Introduction" (12.09) is assigned to a location encompassing thematic/subject zone 12.01. Within the boundaries of zone 12.01, the specific location of the problem statement, the key sentence, is indicated by a circle. The designation "Background" is assigned to a location encompassing thematic/subject zones 12.02–12.05. The designation "U.S. Today" is assigned to a location encompassing thematic/subject zones 12.06 and 12.07. And the designation "Conclusion" is assigned to the location encompassing thematic/subject zone 12.08. Within the boundaries of zone 12.08, the specific location of the conclusion statement, the key sentence, is indicated by a circle.

Finally, the notation "Labor Unions: decline" (12.13) has been added as a kind of title for this textmap. This title serves as the textmap's filename so that it may be filed and retrieved by means of a written language designation. For some individuals, however, such a filename may not be necessary inasmuch as the textmap can be just as easily, if not more easily, filed and retrieved by means of its unique image signature (i.e. as visual, spatial information).

Figure 13:
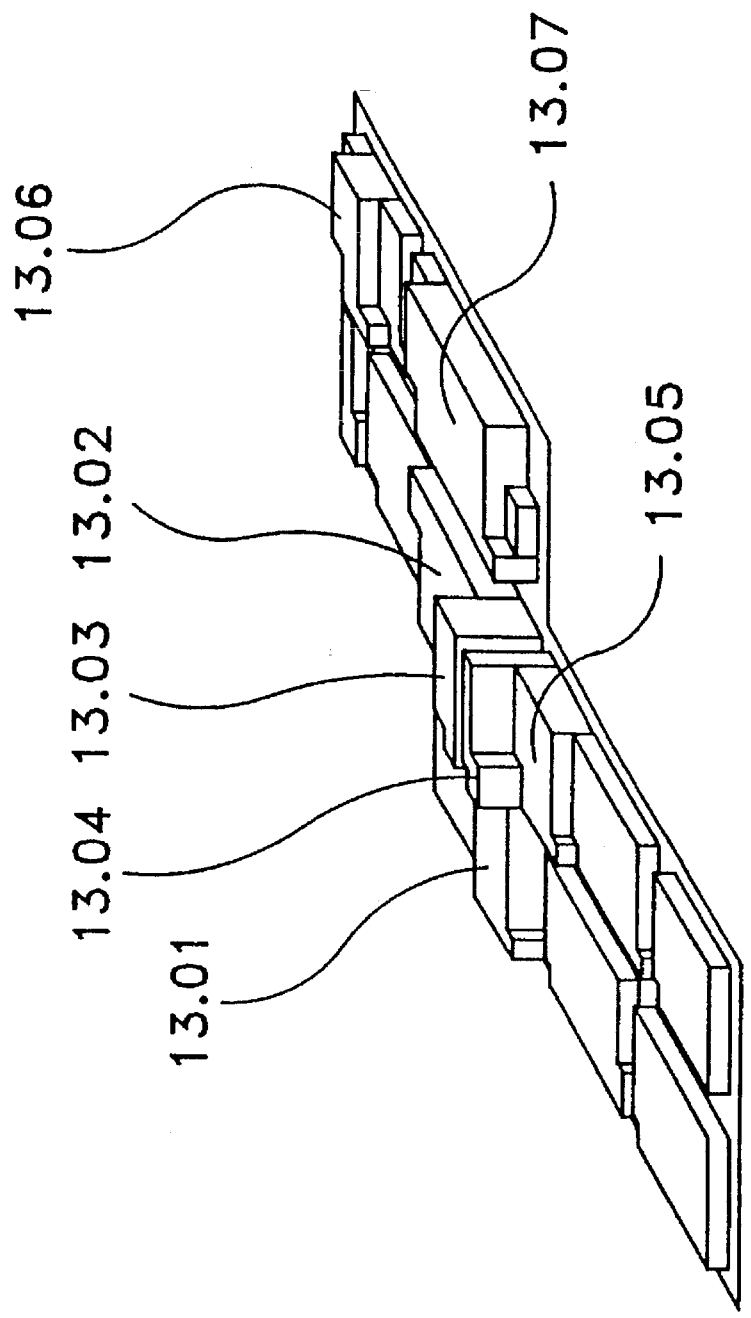
FIG. 13 is an axonometric projection of a same-scale, statistical, daysymetric, relief mapping of the fourth section based upon the planimetric mapping in FIG. 10.

While FIGS. 1–12 are all scaled planimetric maps, it should be noted that textscapes may also be represented by other means such as relief mapping and topologic mapping. For example, FIG. 13 is an axonometric projection of a statistical, daysymetric, relief mapping representing the same information which is shown planimetrically in FIG. 10. The difference is that in FIG. 13, the textscape is treated as a three-dimensional surface, while in FIG. 10 the textscape is treated as a two-dimensional plane. The eight three-dimensional blocks 13.01–13.07 in FIG. 13 correspond to the eight two-dimensional block areas 10.01–10.07 in FIG. 10. It is perhaps a matter of personal perspective as to which of the two mappings, FIG. 10 or FIG. 13, more clearly describes the difference between those locations which contain three Venn intersections, two Venn intersections or zero Venn intersections. Nevertheless, the differences between planimetric and relief textmapping are clearly illustrated by these figures, and the potential uses of relief textmapping should be self-evident.

With regard to topologic mapping, the mapping of the notations in FIG. 12 is, in itself, a separate topologic, planimetric mapping of the text. As discussed above, this topologic mapping represents the compositional structure of the text and serves as a simplified graphic outline, synopsis, or summary of the text message.

As the above description demonstrates, there are many ways to map a text. Once a text is mapped in two or more different ways, the different mappings may, in turn, be used in a variety of ways to achieve a number of different results. Information from two or more maps may be combined selectively or wholesale into a new textmap. Two or more mappings can be compared by sequential display, by juxtaposition, by superimposition, or by animation (very rapid sequential display).

Textmapping may be practiced, in its simplest forms, as a pencil and paper process directly upon a text. For example, one can photocopy the pages from a text, tape the photocopied pages together into a scrolled textscape, and map it. One can also print text from a computer on continuous feed paper, and instead of ripping the printout at the perforations to make separate pages, one can simply leave the continuous feed printout intact. This results in a top-to-bottom oriented scrolled textscape which can be mapped. Similarly, text from a computer can be printed in landscape mode to make a left-to-right oriented scrolled textscape. Landscape printings may be easily made on most laser printers. Landscape printings may also be made by using software print utilities such as "Sideways" by Funk Software.

Likewise, textmapping may be used in classroom and lecture situations. For example, one can photocopy relevant pages from a text, using the copy area reduction feature commonly available on many photocopy machines. The copy reduction feature can be repeated a number of times until the image size of the photocopied pages is very small. This will allow for the display of many pages of text within the area normally occupied by a single page of text. Such small scale displays can be useful, even when the scale of the display is far too small to allow for reading the words of the text as sound information, provided the text is still readable as graphic information. One can then display these reduced-sized pages in some logical sequence (in a top-to-bottom, or left-to-right scrolled arrangement, for example) and copy the whole display onto transparency film. This is easily done on most copy machines, using standard copier-ready sheets of blank transparency film. The transparency can then be displayed by using an overhead projector to project the image of the text onto a wall or screen.

Textmapping may also be practiced on text displayed on a computer screen. Existing computer graphics software, including pen technology for computers, may be used in much the same way as pencils, pens, and colored markers are used to map a text displayed on paper. In addition, elements of existing software programs, such as the search functions commonly employed in most word processing software packages, can be used to quickly locate selected graphic language features in a text. Existing statistical software packages may be used to perform the statistical analysis which serves as the basis for statistical textmapping.

With regard to word processing software, elements of existing word processing and geographic information systems (GIS) software programs could be assembled into an integrated package which would automatically map a text on the basis of a set of standard parameters and rules or on the basis of a set of discovered parameters and rules. The parameters would describe and distinguish the graphic language features of a typography (i.e. the vocabulary of a typography), on the basis of their graphic attributes, phonetic attributes, meaning, and usage. The rules would describe the ways in which this vocabulary is combined and organized (i.e. the grammar of a typography). Because there are already standard typographic conventions in publishing, it would be possible to include in such an integrated software package, a set of standard parameters and rules. Additionally, it would be possible for an integrated software package to "discover" parameters and rules which may be unique to a particular text or which are unique to texts within a particular discipline. This is a capability which is already available in some of the existing search and retrieval software packages.

Textmapping is a process by which the art, science and technology of the graphic arts, cartography, and statistics may be applied, either separately or in various combinations, to the task of mapping graphic language text. While textmapping has been herein shown and described with reference to a preferred embodiment, it will be understood by those skilled in the art that various changes and modifications in form and details may be made therein without departing from the spirit and scope of the invention.

To better describe the present invention of textmapping, consider the flow chart of FIG. 13. Referring to FIG. 13, block 100 marks the start point of the textmapping process. In block 101, a text or a portion of a text is selected. This may be accomplished by such means as choosing a book from a book shelf or by choosing an article from a magazine, CD-ROM or other electronic database. Block 102 asks if the selected text is in computer compatible form. If the text is not in computer compatible form it is converted into such a form using well known means such as scanning the text to disk or keying it in by hand. (See block 103).

In block 104, the text is input/retrieved. This might be accomplished by such means as retrieving the text from a CD-ROM, or from a floppy disc or hard drive.

Block 105 offers the choice of displaying, or not displaying, the text. Hereinafter, the term "display" should be understood to include such display output functions as printing.

It should not be assumed that a text must be displayed in order to be mapped. In the case of an automated mapping process, i.e. one in which the computer automatically maps the text on the basis of a predetermined set of instructions, there is no need to display the text until it has been mapped.

On the other hand, if the individual wishes to control or influence the textmapping process, if the textmapping process is to be only partially automated, for example, it will probably be necessary to display the text so that the individual can monitor the textmapping process while it is in progress.

If the choice is to display the text, the next step is block 106. If the choice is not to display the text, the next step is block 108.

In block 106, the display parameters are defined, and in block 107, the text is displayed. The main display parameters (block 106) would be SIZE/SCALE OF THE TEXT IMAGE and matters concerning typography.

While it is assumed that the text as input/retrieved in block 104 will already be defined typographically, it is important to recognize the fact that the existing typography is not always suited to the individual reader's needs and abilities. In cases where the typography is troublesome to the individual, a few simple improvements may be necessary. Such improvements might include adjusting the line spacing, increasing paragraph indentations, changing the font style or boldness of subtitles in the text, changing column width, increasing the font size, changing the color of the text and/or background, and other such modifications.

Block 108 is a subroutine which means that it is a process which functions within the context of the larger process, i.e. SCAN/SEARCH is a subroutine of TEXTMAPPING. There is a separate flowchart for the SCAN/SEARCH subroutine.

The subroutine represented by block 108 is shown in FIG. 13.

In brief, the SCAN/SEARCH subroutine is a survey of the text. It may be conducted visually by the individual with little or no scan/search assistance from the computer. It may be conducted with some scan/search assistance from the computer. Finally, it may be conducted automatically by the computer.

A text may be scanned/searched (surveyed) from one or more of four different perspectives. The order in which they are presented here is not important. First, the text may be scanned/searched for visually prominent graphic language features. Second, the text may be scanned/searched for specified graphic language features. Third, the text may be scanned/searched for any or all graphic language features which appear on a pre-existing list of graphic language features. Fourth, the text may be scanned/searched and an inventory may be compiled either of all instances of graphic language features appearing in the text or of all instances belonging to specified classes of graphic language features in the text.

Graphic language features may be described and sorted on the basis of one or more of the following attributes: location, graphic attributes, phonetic attributes, meaning, usage.

The results of the scan/search may be saved as textmap images or as digital-locational data. They may be displayed in the context of one or more textmaps, or they may be superimposed directly over the text. The results may also be displayed in one or more alternative graphic language text formats such as lists, charts, graphs, or histograms, each of which may, in turn, be mapped by means of the textmapping process defined by the master flowchart (blocks 100–116) of which this subroutine is a part.

If the scan/search is automated, the results do not have to be displayed until the individual wishes to see them. The display parameters are user-definable. Each textmap or digital-locational dataset may be saved for future use.

The textmap may be drawn automatically by the computer, or it may be drawn by the individual with or without the assistance of the computer.

Block 109 offers the choice of performing, or not performing, a statistical analysis of the results of the scan/search. It is not always necessary to perform a statistical analysis of the scan/search results, nor is it always desirable. For example, a cursory visual scan/search conducted with little or no computer assistance is not likely to result in sufficient data to warrant a statistical analysis.

If the choice is to perform the statistical analysis, the next step is block 110. If the choice is to not perform the statistical analysis, the next step is block 111.

Block 110 is the statistical analysis subroutine. There is a separate flowchart for this subroutine shown in FIG. 15. In brief, the statistical analysis subroutine involves the use of multivariate analytical techniques for determining the significance and influence, i.e. the distribution, specificity, and spread, of graphic language features in a text. Due to the complexity of multivariate analysis, especially when applied to graphic language text, it is preferable that the statistical analysis be conducted with the assistance of a computer. It is possible, however, to conduct such a statistical analysis without the assistance of a computer. Statistical analysis may be conducted as an automated process guided by pre-set parameters and formulas, and in many applications this may prove to be the best application.

The results of the statistical analysis may be saved as textmap images or as digital-locational data. They may be displayed in the context of one or more textmaps, or they may be superimposed directly over the text. The results may also be displayed in one or more alternative graphic language text formats such as lists, charts, graphs, or histograms, each of which may, in turn, be mapped by means of the textmapping process defined by the master flowchart (blocks 100–116) of which this subroutine is a part.

If the statistical analysis is automated, the results do not have to be displayed until the individual wishes to see them. The display parameters are user-definable. Each textmap or digital-locational dataset may be saved for future use.

The textmap may be drawn automatically by the computer, or it may be drawn by the individual with or without the assistance of the computer.

Block 111 offers the choice of performing, or not performing, another scan/search. This option allows the individual the flexibility to re-survey the text as many times as desired, thus allowing for two or more surveys of the same text where each survey is based upon a different combination and/or sequence of attributes. This option also allows for the survey of a text from a number of different perspectives (see block 108), as well as for the reconsideration of a text on the basis of new information obtained by means of the textmap comparison subroutine (see block 114).

If the choice is to perform another scan/search, the next step is block 108. If the choice is to not perform another scan/search, the next step is block 112.

Block 112 asks if there are two or more textmaps (or two or more sets of digital-locational data) on file. If the answer is NO, the next step is block 116 (the terminal block labeled "End"). If the answer is YES, the next step is block 113.

Block 113 offers the choice of performing the textmap comparison subroutine. If the choice is to not perform the textmap comparison subroutine, the next step is block 116 (the terminal block labeled "End"). If the choice is to perform the textmap comparison subroutine, the next step is block 114.

Block 114 is the textmap comparison subroutine. There is a separate flowchart for this subroutine shown in FIG. 16. In brief, the textmap comparison subroutine involves the comparison of two or more textmaps of the same text, and/or the comparison of two or more digital-locational datsets of the same text. Textmaps may be compared visually by the individual. Datasets are compared by the computer.

Visual comparison of two or more textmaps is performed by displaying the textmaps in at least one of four ways: juxtaposition, superimposition, sequential display, or animated display (rapid sequential display).

The results of visual and dataset comparisons may be saved as textmap images or as digital-locational data. They may be displayed in the context of one or more textmaps, or they may be superimposed directly over the text. The results may also be displayed in one or more alternative graphic language text formats such as lists, charts, graphs, or histograms, each of which may, in turn, be mapped by means of the textmapping process defined by the master flowchart (blocks 100–116) of which this subroutine is a part.

If the textmap comparison is automated, the results do not have to be displayed until the individual wishes to see them. The display parameters are user-definable. Each textmap or digital-locational dataset may be saved for future use.

The textmap may be drawn automatically by the computer, or it may be drawn by the individual with or without the assistance of the computer.

Block 115 offers the choice of stopping, or continuing with, the textmapping process. If the choice is to stop the process, the next step is block 116 (the terminal block labeled "End"). If the choice is to continue with the process, the next step is block 111.

Block 116 marks the end point of the textmapping process.

Figure 14:
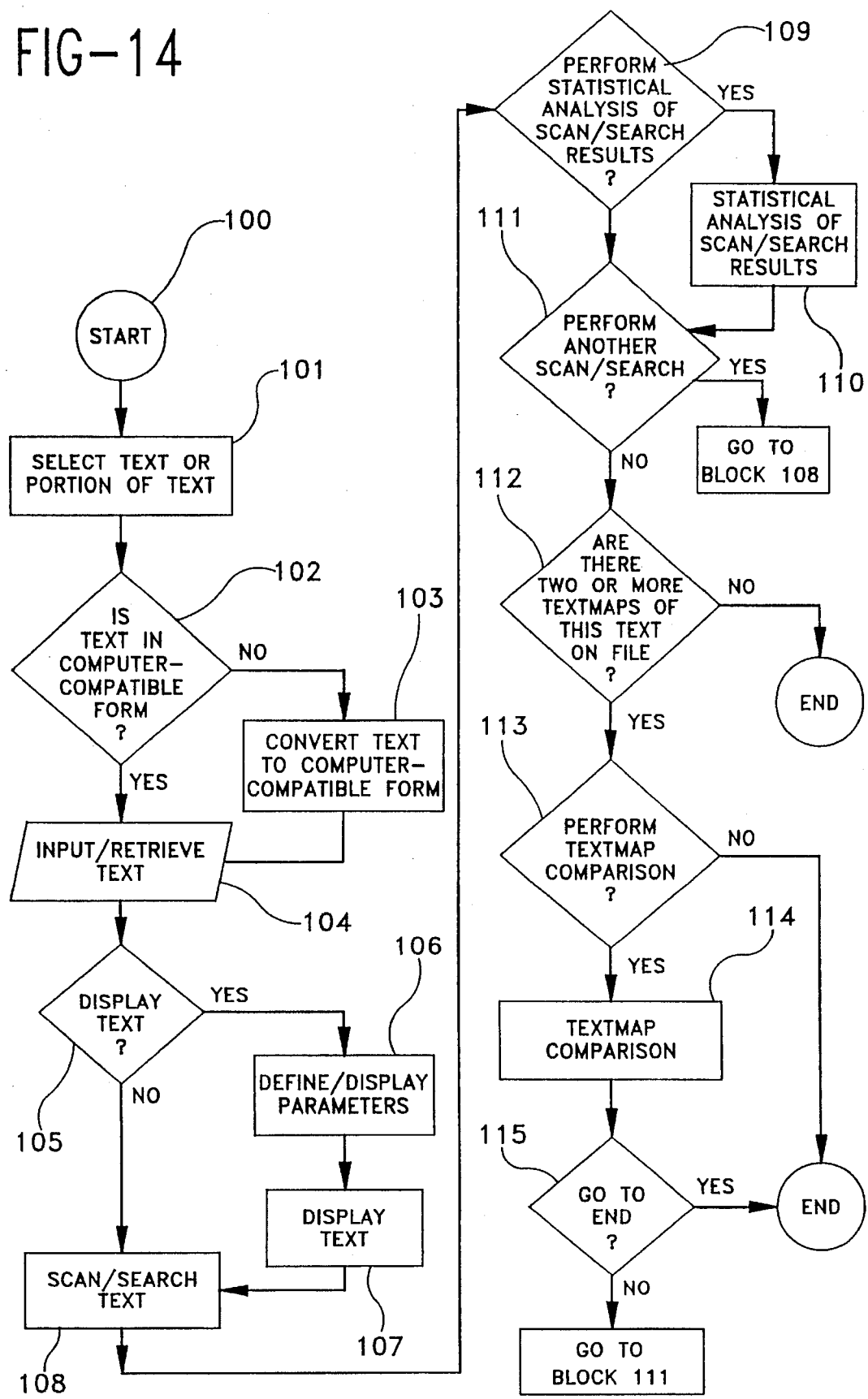
FIG. 14 is a flow chart illustration the operational logic of the present invention method.
Figure 15:
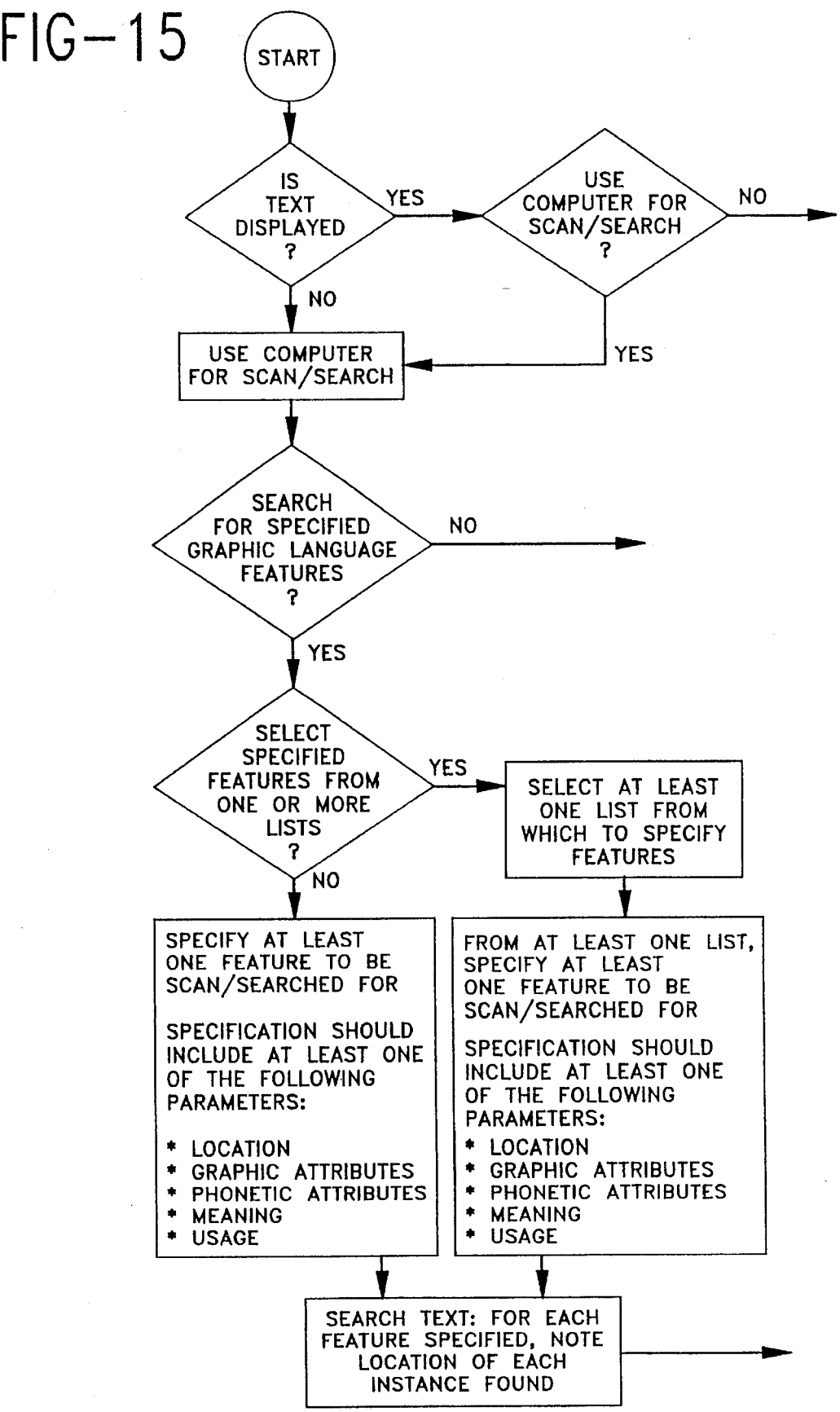
FIG. 15 is a first subroutine used within the flow chart of FIG. 14.
Figure 15A:
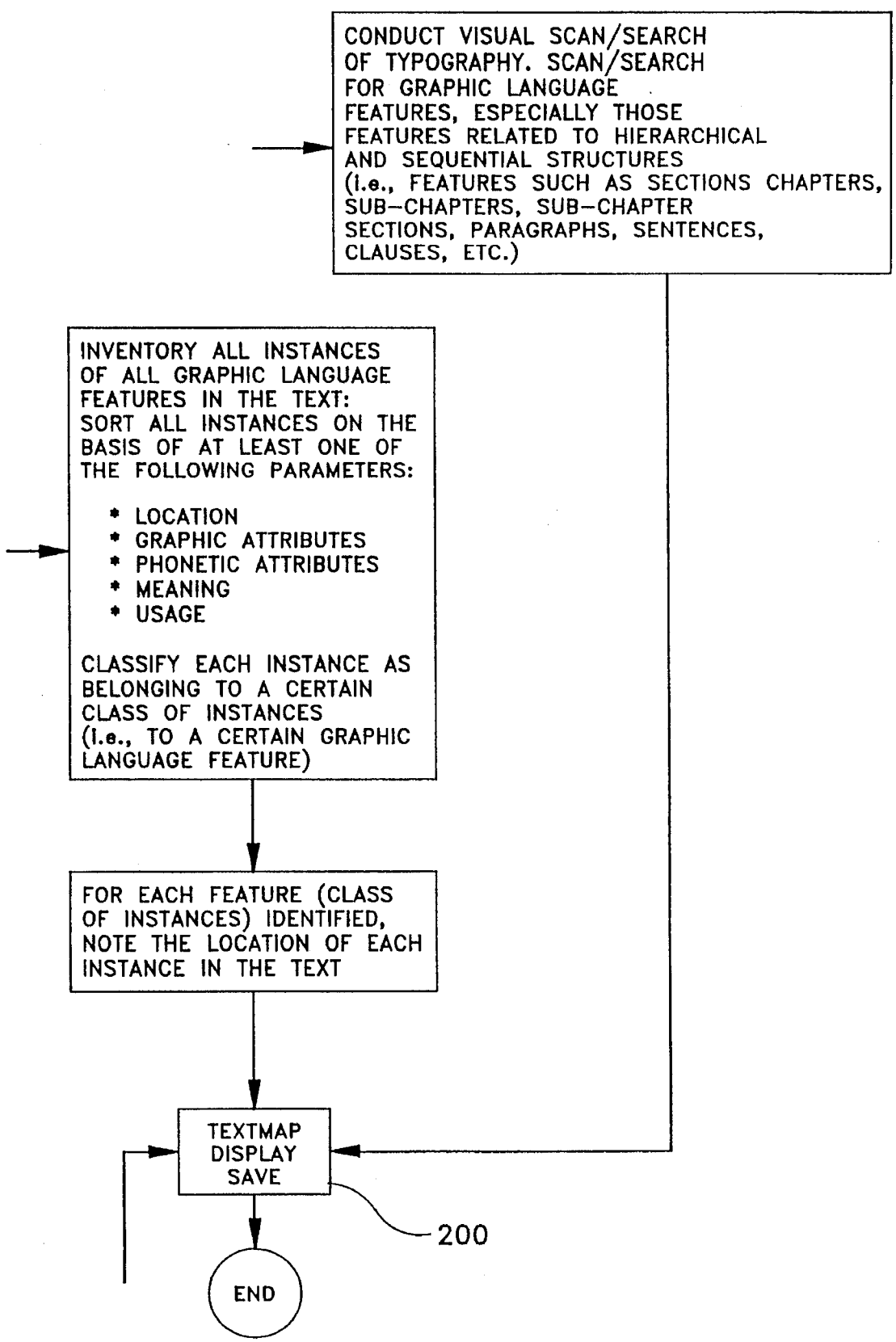
Figure 16:
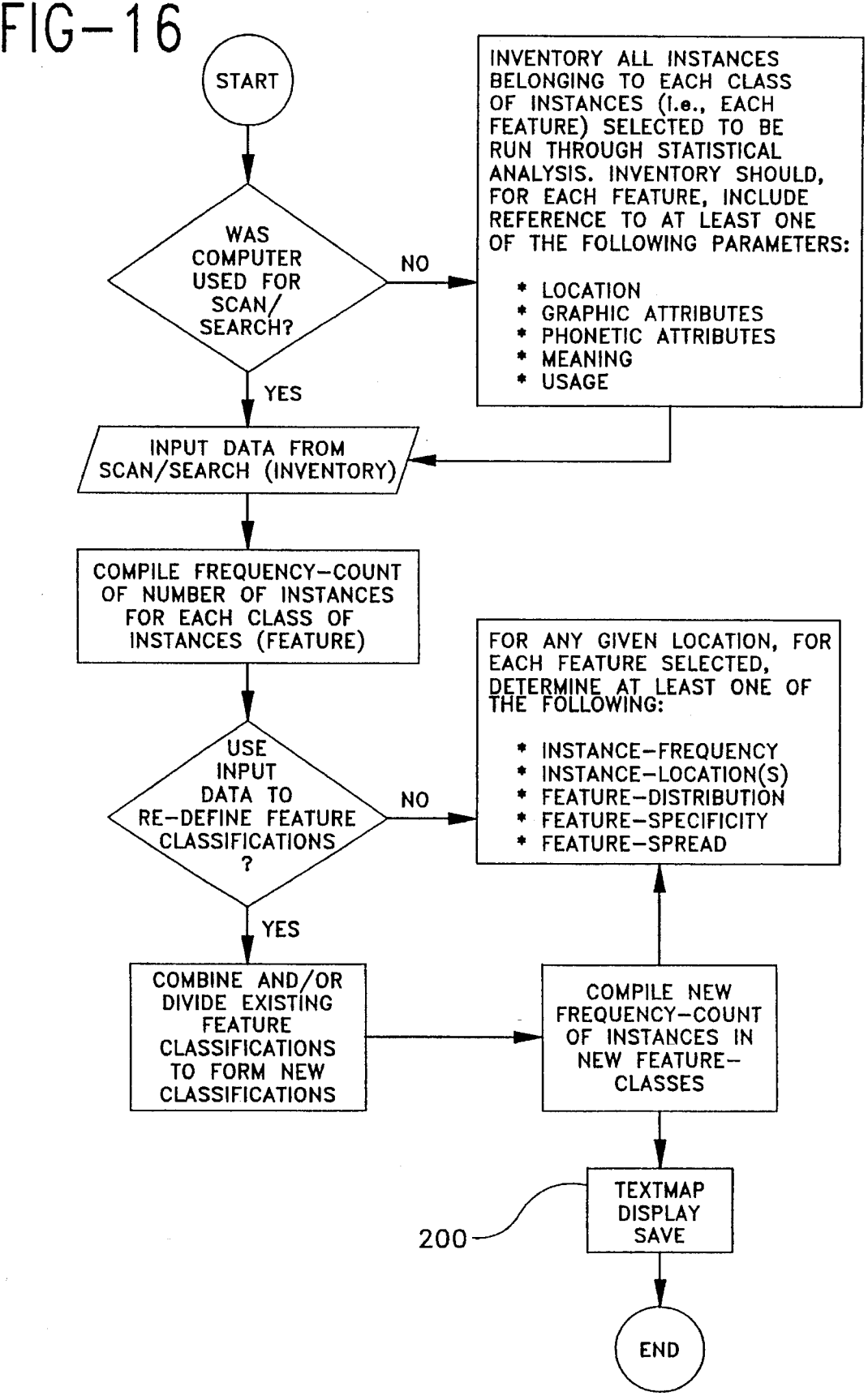
FIG. 16 is a second subroutine used within the flow chart of FIG. 14.
Figure 17:
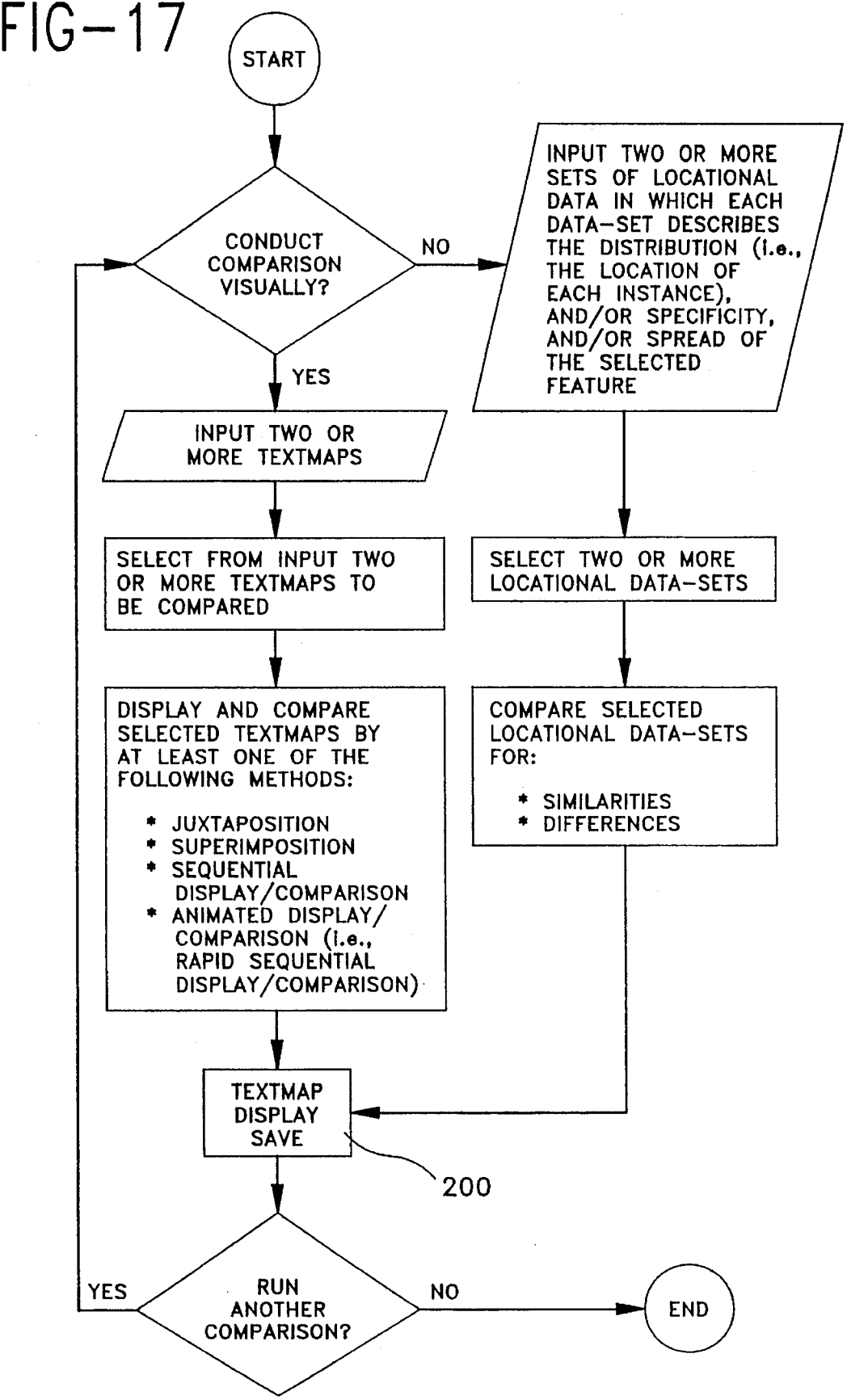
FIG. 17 is a third subroutine used within the flow chart of FIG. 14.
Figure 18:
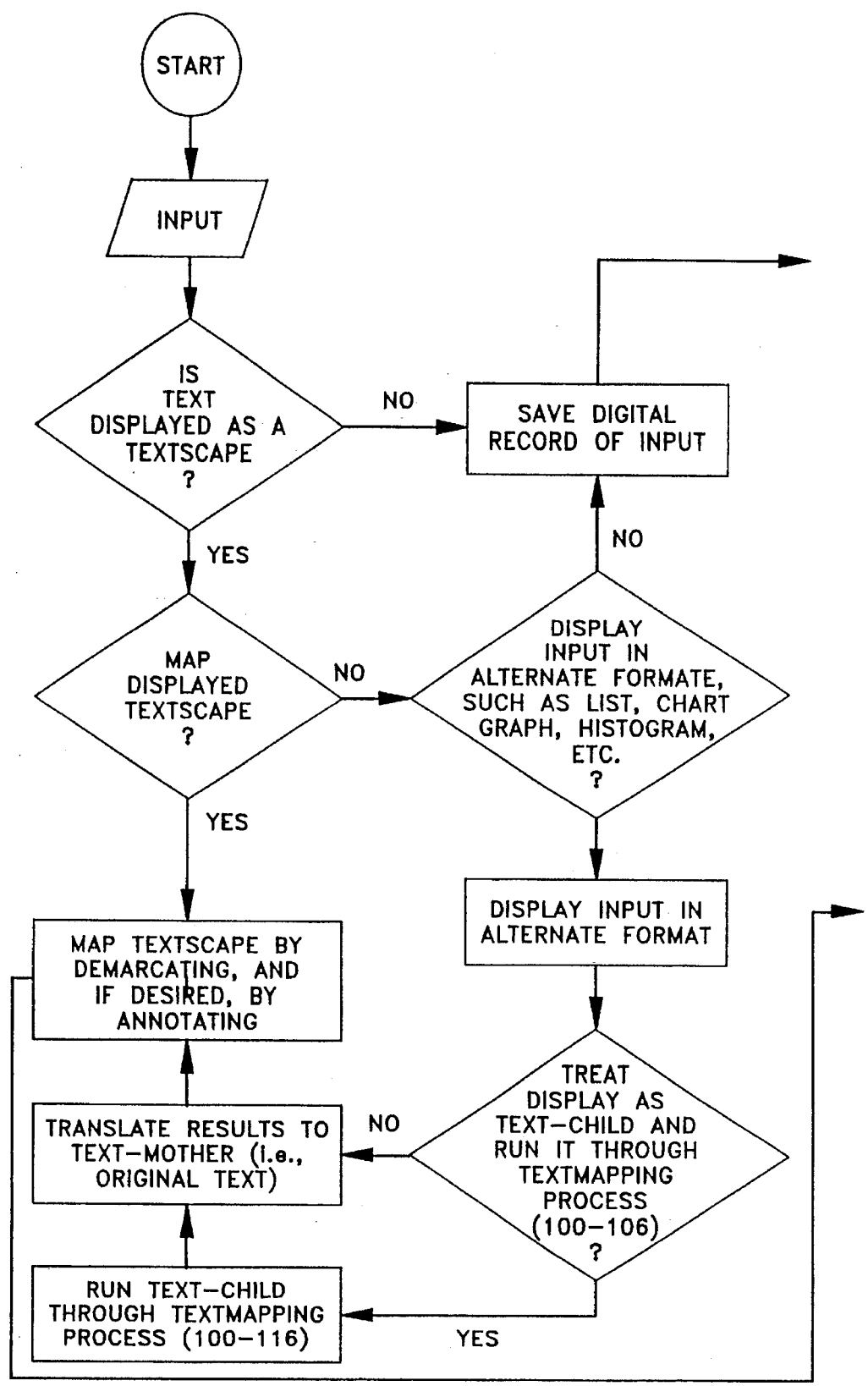
FIG. 18 is a sub-subroutine used within the subroutines of FIGS. 15, 16 and 17.
Figure 18A:
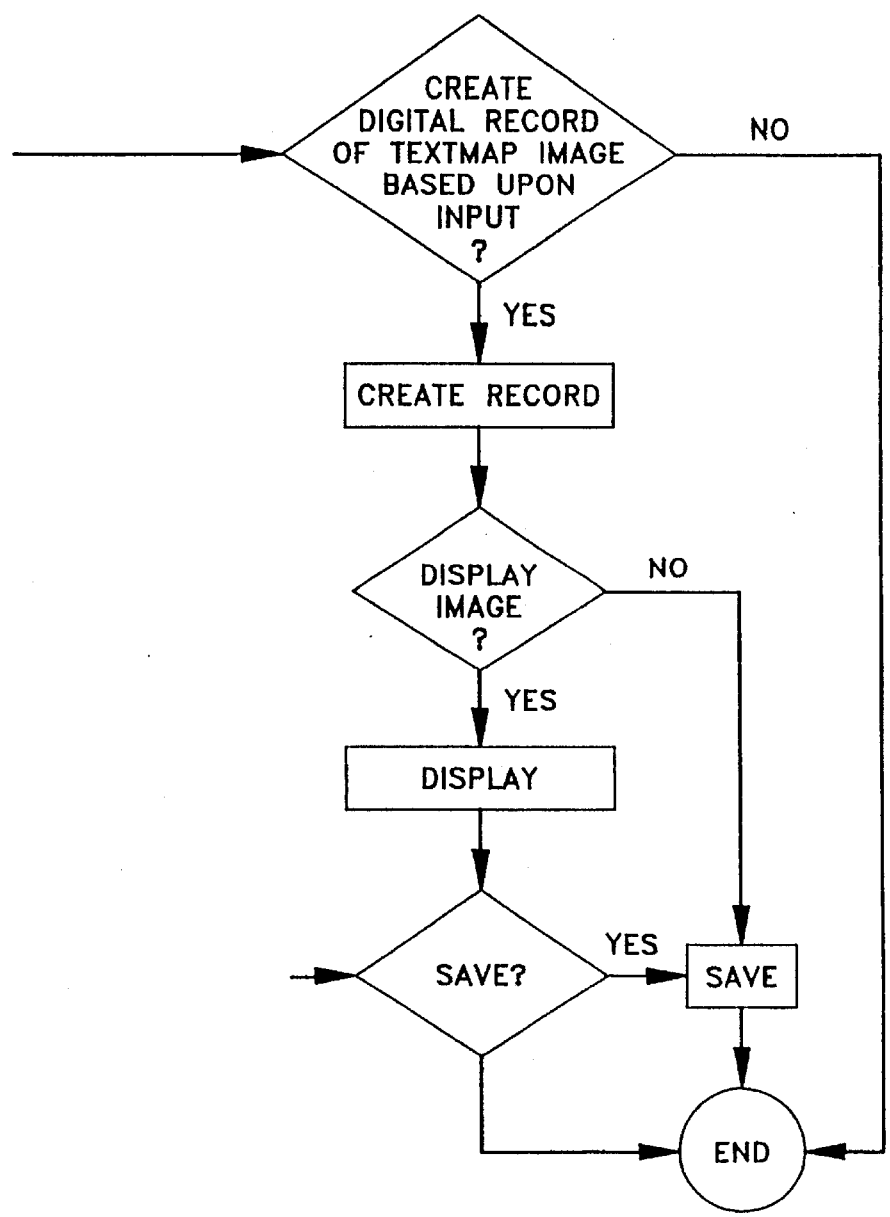

The subroutines of blocks 108, 110 and 114 which are shown by FIGS. 14, 15 and 16, respectively, all contain a sub-subroutine shown as block 200. The sub-subroutine indicated by block 200 in FIGS. 14, 15 and 16 is shown by FIG. 17.

What I claim is:

1. A method of producing a graphical representation of text contained within a document to enable a person to obtain some comprehension of said text without reading all of said text, comprising the steps of:

producing an image of at least some of said text, wherein individual words contained within said text are indecipherable within said image to a person viewing said image;

identifying at least one common feature contained within said text, wherein said at least one common feature is selected from a group consisting of: physical appearance of text, phonetics of text, meaning of text, usage of text, definition of text, location of text and distribution of text; and segmenting said image into a first plurality of visually distinguishable segments to create a first map, wherein each of said visually distinguishable segments on said first map corresponds to at least one of said common features in said text, thereby enabling a person viewing said image to comprehend where each said common features occurs within said text without reading said text.

2. The method according to claim 1 further including the steps of:

identifying at least one second common feature contained within said text, wherein said at least one second common feature is selected from a group consisting of: physical appearance of text, phonetics of text, meaning of text, usage of text, definition of text, location of text and distribution of text; and creating a second map of said image by segmenting said image into a second plurality of visually distinguishable segments wherein each of said second plurality of visually distinguishable segments corresponds to at least one of said second common features.

3. The method according to claim 2 further including the step of graphically comparing said first map and said second map to determine areas on said image that are commonly distinguishable on said first map and on said second map.

4. The method according to claim 3 further including the step of creating a third map from comparing said first map to said second map.

5. The method according to claim 1 wherein said visually distinguishable segments are areas on said image that are distinguishable by a graphical means selected from a group consisting of demarkation, blocking, brightening, darkening, shading, hatching, stippling, varying size, and marking with a symbol.

6. The method according to claim 1 wherein said first map is selected from a group consisting of a base-typographic map, a detail-typographic map, a chorochromatic map, a daysymetric map, a point-symbol map, a planimetric map, a relief map, and a topologic map.

7. The method according to claim 6 wherein said first map is selected from a group consisting of a small-scale map, a large scale map and a same-scale map.

8. A method of producing a graphical representation of text contained within a document to enable a person to obtain some comprehension of said text without reading said text, comprising the steps of:

identifying at least one common feature contained within said text, wherein said at least one common feature is selected from a group consisting of: physical appearance of text, phonetics of text, meaning of text, usage of text, definition of text, location of text and distribution of text; and plotting the occurrences of said at least one common feature on a graph to obtain a graphical representation of said at least one common feature contained within the text, thereby enabling a person viewing said graph to ascertain information about said common features within said text without reading said text.

9. The method according to claim 8 wherein said graph contains a three dimensional representation of said occurrences.

* * * * *